(12) United States Patent
Allen et al.

(10) Patent No.: US 11,279,452 B2
(45) Date of Patent: Mar. 22, 2022

(54) MOTION ABSORBING SYSTEM AND METHOD FOR A STRUCTURE

(71) Applicant: University of Maine System Board of Trustees, Orono, ME (US)

(72) Inventors: Christopher K. Allen, Bangor, ME (US); Anthony M. Viselli, Bangor, ME (US); Andrew J. Goupee, Ellsworth, ME (US); Habib J. Dagher, Veazie, ME (US); Robert E. Berry, Madison, AL (US); Jeffrey L. Lindner, Madison, AL (US); Frederick S. Gant, Huntsville, AL (US); John S. Townsend, Union Grove, AL (US); Rebecca L. Williams, Huntsville, AL (US)

(73) Assignee: University of Maine System Board of Trustees, Orono, ME (US)

( * ) Notice: Subject to any disclaimer, the term of this patent is extended or adjusted under 35 U.S.C. 154(b) by 0 days.

(21) Appl. No.: 17/314,201

(22) Filed: May 7, 2021

(65) Prior Publication Data

US 2021/0269126 A1 Sep. 2, 2021

Related U.S. Application Data

(63) Continuation-in-part of application No. 17/290,518, filed as application No. PCT/US2019/059628 on Nov. 4, 2019.

(Continued)

(51) Int. Cl.
*B63B 39/03* (2006.01)
*F03D 13/25* (2016.01)
(Continued)

(52) U.S. Cl.
CPC .............. *B63B 39/03* (2013.01); *B63B 35/44* (2013.01); *B63B 39/02* (2013.01); *B63B 79/15* (2020.01);
(Continued)

(58) Field of Classification Search
CPC ... B63B 35/44; B63B 2035/446; B63B 39/03; F03D 13/15; F05B 2240/93; F05B 2240/95
See application file for complete search history.

(56) References Cited

U.S. PATENT DOCUMENTS 4,167,147 A * 9/1979 Bergman ................ B63B 39/03
114/122
4,226,554 A * 10/1980 Vandiver ............... B63B 39/005
405/195.1

(Continued)

FOREIGN PATENT DOCUMENTS

CN 202783720 U 3/2013

OTHER PUBLICATIONS

PCT International Search Report and Written Opinion, Application No. PCT/US19/59628, dated Apr. 20, 2020.
(Continued)

*Primary Examiner* — S. Joseph Morano
*Assistant Examiner* — Jovon E Hayes
(74) *Attorney, Agent, or Firm* — MacMillan, Sobanski & Todd, LLC

(57) ABSTRACT

A motion absorbing system and method for a structure includes the coupling of a container to a structure. The container has a liquid disposed therein wherein a ullage is defined above a surface of the liquid. An elastic element is positioned in the liquid. The elastic element has a natural frequency tuned to damp motion of the liquid.

51 Claims, 15 Drawing Sheets

Related U.S. Application Data

(60) Provisional application No. 62/754,699, filed on Nov. 2, 2018.

(51) Int. Cl.
  B63B 35/44 (2006.01)
  B63B 79/15 (2020.01)
  B63B 39/02 (2006.01)

(52) U.S. Cl.
  CPC ........ *F03D 13/25* (2016.05); *B63B 2035/446* (2013.01); *F05B 2240/93* (2013.01); *F05B 2240/95* (2013.01); *F05B 2260/964* (2013.01)

(56) References Cited

U.S. PATENT DOCUMENTS

| | | | | |
|---|---|---|---|---|
| 5,456,114 | A * | 10/1995 | Liu | B64D 15/20 73/290 V |
| 6,378,451 | B1 * | 4/2002 | Wetch | B63B 13/00 114/125 |
| 8,387,550 | B2 * | 3/2013 | Mansour | B63B 35/44 114/265 |
| 9,302,747 | B2 * | 4/2016 | Lambrakos | B63B 39/06 |
| 9,657,717 | B2 * | 5/2017 | Ollgaard | E04H 9/0215 |
| 10,087,915 | B1 * | 10/2018 | Srinivasan | F03D 13/25 |
| 10,442,507 | B2 * | 10/2019 | Kamal | B63B 35/44 |
| 10,549,818 | B2 * | 2/2020 | Merchant | B63B 1/041 |
| 10,822,060 | B1 * | 11/2020 | Montestruc | B63B 39/03 |
| 2007/0283866 | A1 * | 12/2007 | Veazey | B63B 5/18 114/77 R |
| 2010/0170222 | A1 * | 7/2010 | Rogers | F02K 9/58 60/240 |
| 2011/0037264 | A1 * | 2/2011 | Roddier | F03D 9/25 290/44 |
| 2012/0121413 | A1 * | 5/2012 | Rodriguez Tsouroukdissian | F16F 15/02 416/1 |
| 2014/0079548 | A1 * | 3/2014 | Rodriguez Tsouroukdissian | E02B 17/0004 416/85 |
| 2014/0339828 | A1 * | 11/2014 | Peiffer | B63B 39/03 290/44 |
| 2020/0056578 | A1 * | 2/2020 | Sheldon-Coulson | B63B 35/44 |

OTHER PUBLICATIONS

Zhang et al., "Vibration control of floating offshore wind turbines using liquid column dampers", Journal of Physics: Conf. Series 1037, 2018, pp. 1-11.

He et al., "Optimization design of tuned mass damper for vibration suppression of a barge-type offshore floating wind turbine", Journal of Engineering for the Maritime Environment, 2017, vol. 231, No. 1, pp. 302-315.

Tong et al., "Passive vibration control of an offshore floating hydrostatic wind turbine model", Wind Energy, 2018, pp. 1-22.

Ding et al., "Study on TMD Control on Stability Improvement of Barge-Supported Floating Offshore Wind Turbine Based on the Multi-Island Genetic Algorithm", Chinese Ocean Engineering, 2019, vol. 33, No. 3, pp. 309-321.

Stol et al., "A Review of Floating Wind Turbine Controllers", Handbook of Wind Power Systems, 2015, pp. 415-441.

* cited by examiner

MOTION ABSORBING SYSTEM AND METHOD FOR A STRUCTURE

This is a continuation-in-part of U.S. application Ser. No. 17/290,518 filed Apr. 30, 2021, which claims priority from International Application No. PCT/US2019/059628 filed Nov. 4, 2019, which claims priority from U.S. provisional patent application 62/754,699 filed Nov. 2, 2018.

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore.

BACKGROUND OF THE INVENTION

1. Field of the Invention

This invention relates to motion absorbing systems and methods. More specifically, the invention is motion absorbing system and method for a structure that experiences oscillating motion caused by an external environment as is the case with structures that float on a body of water.

2. Description of the Related Art

A variety of structures must be able to withstand motion that is induced by the environment in which the structure resides. For example, bridges and buildings must be able to withstand motion caused by wind and/or ground movements. Water-borne floating structures such as barges, ships, and oil-gas or wind-turbine platforms, must be able to withstand motion caused by sea currents, waves, and/or wind. Unfortunately, when structure designers/engineers have to rely completely on a statics-based mechanical design to achieve a motion-withstanding structure, the design is often too complex, too costly, and/or too heavy, to make it practical or commercially viable.

SUMMARY OF THE INVENTION

Accordingly, it is an object of the present invention to provide a motion absorbing system and method for structures.

Another object of the present invention is to provide a motion absorbing system and method that can be used with existing or new structures.

Still another object of the present invention is to provide a motion absorbing system and method that can be used to damp motion of structures that is caused by an environment in which the structure resides.

Yet another object of the present invention is to provide a motion absorbing system and method for a variety of structures that float on a body of water.

Other objects and advantages of the present invention will become more obvious hereinafter in the specification and drawings.

In accordance with the present invention, a motion absorbing system and method for a structure are provided. A container is coupled to a structure. The container has a liquid disposed therein wherein a ullage is defined above a surface of the liquid. An elastic element is positioned in the liquid. The elastic element has a natural frequency tuned to damp motion of the liquid.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
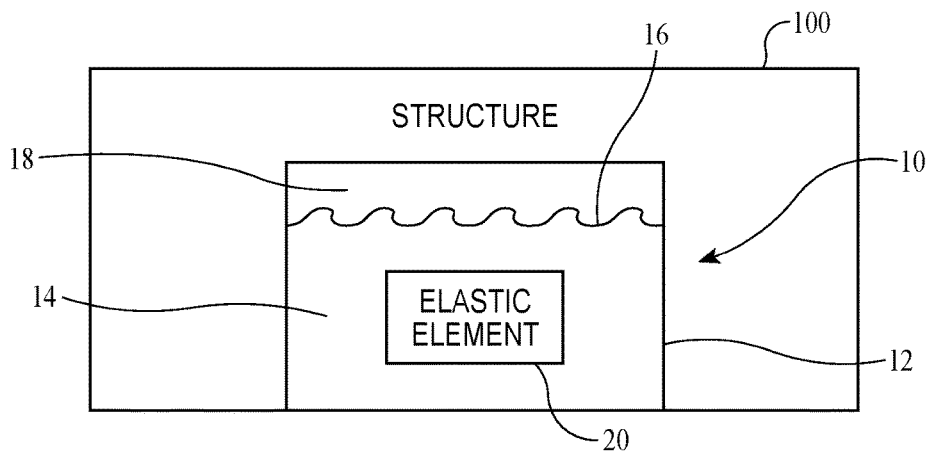
FIG. 1 is a schematic view of a motion absorbing system for a structure in accordance with an embodiment of the present invention.

Referring now to the drawings and more particularly to FIG. 1, a motion absorbing system for a structure 100 in accordance with an embodiment of the present invention is shown and is referenced generally by numeral 10. Structure 100 can be any that is subject to motion (e.g., swaying, vibration, pitch, roll, heave, etc.) induced by the environment in which structure 100 resides. The induced motion of structure 100 is substantially absorbed by motion absorbing system 10 that will be referred to hereinafter simply as motion absorber 10. In general, motion absorber 10 is coupled to structure 100 and damps out the environmentally-induced motion of structure 100.

Motion absorber 10 includes a container 12 coupled to a portion of structure 100 such that environmentally-induced motion of structure 100 is imparted to container 12. Container 12 is generally rigid and can be made from the same or different materials used for structure 100 without departing from the scope of the present invention. Disposed within container 12 is a liquid 14 whose surface 16 is spaced-apart from the top of container 12 to thereby define ullage 18 above liquid surface 16. The choice for liquid 14 is not a limitation of the present invention. The environmentally-induced motion of structure 100 imparted to container 12 is ultimately transferred to liquid 14 that, in turn, experiences its own motion within container 12.

Disposed within liquid 14 is an elastic element 20 that functions to damp out the motion of liquid 14 as the means to damp out the environmentally-induced motion of structure 100. In general, elastic element 20 serves as an engineered compressible degree of freedom positioned within a bulk fluid (i.e., liquid 14) whose fluid mass captured within container 12 serves as a slave or damping mass. Elastic element 20 has a natural frequency tuned to damp out motion of liquid 14 within container 12. In this way, motion absorber 10 changes induced motion characteristics of structure 100 by creating a tuned mass damper effect. The tuning of motion absorber 10 can be tailored for specific frequency (ies) of concern.

One or more motion absorbers 10 can be coupled to structure 100. The multiple absorbers can be tuned for different frequencies in order to provide a broader spectrum of motion absorption. Placement and/or orientations of the multiple absorbers can also be used to damp out motion in a plurality of dimensions. One or more motion absorbers 10 can be self-contained units added to existing structures, or can be integrated into new structures. In some applications, the present invention can leverage features of existing structures for ready incorporation therein. For example and as will be explained further below, the present invention is readily incorporated into floating structures that have ballast tanks with ballast water therein. Such floating structures include barges, ships, floating platforms used to support oil/gas drilling rigs, wind turbines, buoys, etc.

Figure 2:
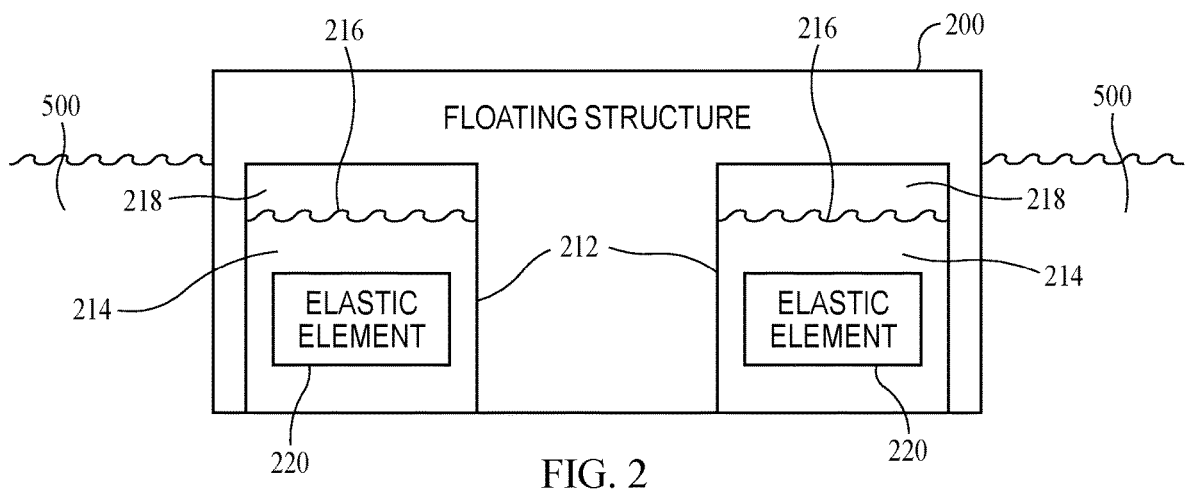
FIG. 2 is a schematic view of a motion absorbing system for a floating structure utilizing the floating structure's ballast tanks in accordance with another embodiment of the present invention.

Referring now to FIG. 2, a floating structure 200 is shown floating in a body of water 500 that could be a river, lake, ocean, etc. As is typically the case with most floating structures, one or more ballast tanks 212 are provided in and are rigidly incorporated into floating structure 212. Each ballast tank 212 can be used to provide the function of the above-described container 12. Accordingly, ballast water 214 in ballast tanks 212 can be leveraged as a slave mass of a motion absorber created in accordance with the present invention by the inclusion of an elastic element 220 in ballast water 214. The surface of ballast water 214 is indicated at 216 with ullage 218 being defined above ballast water surface 216. Tuning of each ballast-tank motion absorber can be tailored for the needs of a specific application.

Figure 3:
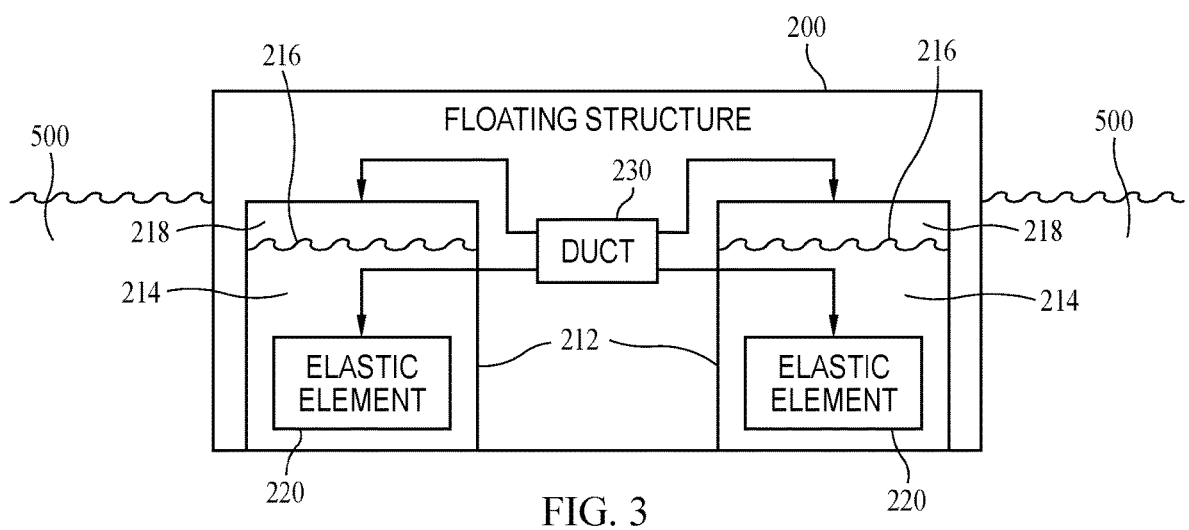
FIG. 3 is a schematic view of a motion absorbing system for a floating structure in which multiple motion absorbers are configured for fluid communication therebetween in accordance with another embodiment of the present invention.

Multiple motion absorbers of a structure (i.e., static or floating) can operate independently or can be coupled for dependency without departing from the scope of the present invention. For example and as illustrated in FIG. 3, the above-described floating structure 200 has two of its ballast-tank motion absorbers in fluid communication with each other via a duct 230. Duct 230 could provide fluid communication between two ullages 218, between two gas chambers (not shown) of elastic elements 220, or both. Providing fluid communication between two or more motion absorbers essentially couples the absorbers' slave masses. As a result, the slave masses located in the different ballast tanks can be dynamically coupled together allowing the separate slave mass components to work in concert to mitigate overall system dynamics. Essentially, the duct provides a convenient kinematic linkage between ballast slave masses that are located in different sections of the structure.

The elastic element (e.g., 20 or 220) used in a motion absorber of the present invention can be constructed in a variety of ways without departing from the scope of the present invention. Several non-limiting examples are shown in FIGS. 4-7 and will be described below. In each example, a single motion absorber 10 is shown in isolation. In all embodiments of the present invention to include those illustrated in FIGS. 4-7, the elastic element provides a structural arrangement that allows the fluid mass of a system to be sprung and leveraged as a mitigating mass. That is, rather than entrapping a large motion mitigating mass within an absorber as is the case with conventional absorbers, the elastic element of the present invention introduces a small swept volume within a much larger fluid mass (e.g., 14 or 214). The larger fluid mass will naturally flow towards or away from the elastic element as the elastic element expands or compresses, respectively. In this way, a very small elastic element leverages the much larger fluid mass as a slave mass. This situation is highly advantageous as a desired amount of leveraged mass can be achieved with a significantly smaller system than the conventional approach. This is especially true for applications where there is significantly more fluid available for leveraging outside the device than could be practically entrapped within the device. In terms of motion or vibration absorption, the absorber's use of the larger fluid mass essentially splits the modes of liquid motion farther apart and reduces the responses of its resultant peaks.

Figure 4:
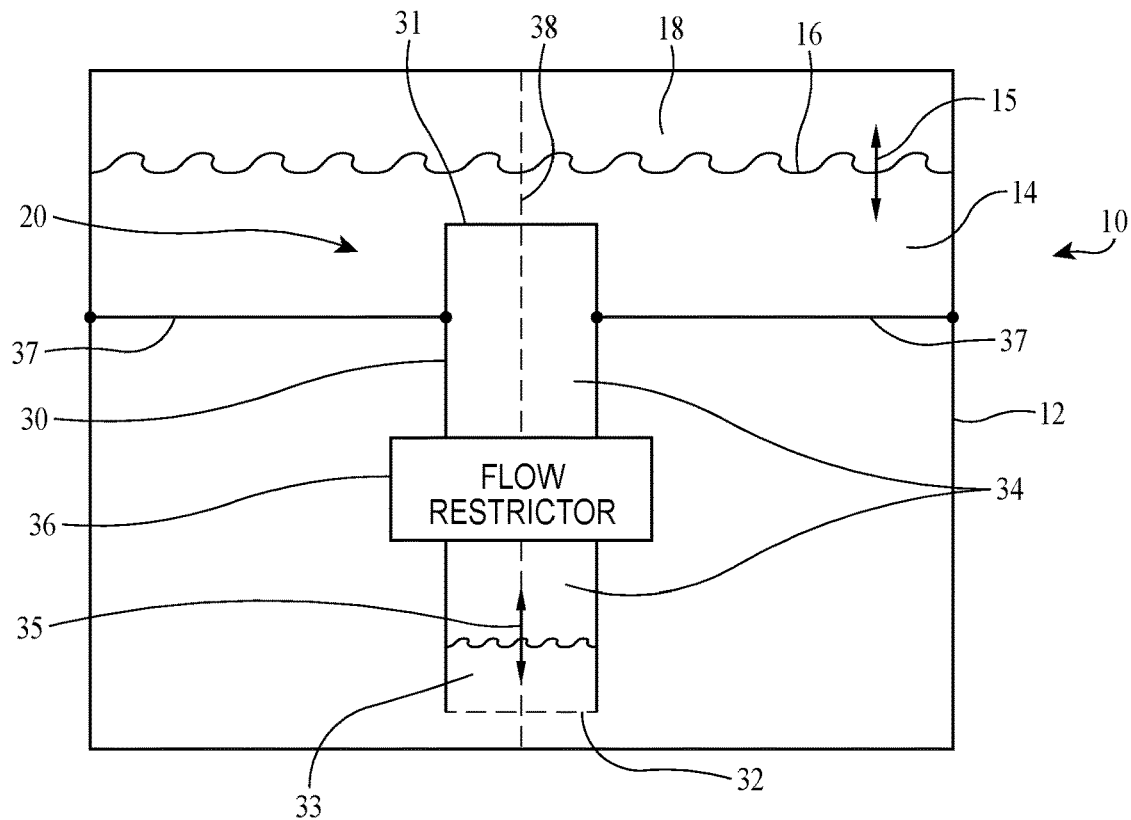
FIG. 4 is an isolated schematic view of a single motion absorber employing a tube disposed in the absorber's liquid in accordance with an embodiment of the present invention.

Referring first to FIG. 4, elastic element 20 includes a tube 30 having a closed end 31 and an open end 32. Tube 30 is disposed in liquid 14 such that a piston 33 of liquid 14 resides in tube 30 to thereby seal open end 32. Tube 30 can be fully immersed in liquid 14 (as shown) or partially immersed in liquid 14 without departing from the scope of the present invention. A gas 34 (e.g., air) fills the region of tube 30 between piston 33 and closed end 31. During motion of liquid 14 in container 12, piston 33 increases in size/mass when it moves up in tube 30 and decreases in size/mass when is moves down in tube 30 as indicated by two-headed arrow 35. The resulting compression/expansion of gas 34 acts as a spring that absorbs/damps out the motion of liquid 14. To maximize the attenuation of the gas spring, a flow restrictor 36 can be disposed in tube 30 to control the movement of gas 34 in the region of tube 30 between piston 33 and closed end 31. Tube 30 can be supported in container 12 by means of supports 37 coupling tube 30 to container 12. Although not required, supports 37 can position tube 30 in liquid 14 such that the tube's longitudinal axis 38 is approximately perpendicular to the liquid's surface 16.

In general, when motion absorber 10 is exposed to vibrational energy, liquid 14 reacts to such energy so that surface 16 moves up and down in container 12 as indicated by two-headed arrow 15. In correspondence with the up-down movement of surface 16, piston 33 increases in size when surface 16 moves down and decreases in size when surface 16 moves up. Since open end 32 of tube 30 is coupled to liquid 14, gas 34 forms a compressible gas damper having a single degree of freedom. In the illustrated embodiment, the compressible gas damper's single degree of freedom is approximately coincident with the up/down movement of surface 16.

The vibrationally-induced incremental change in piston 33 triggers a reacting fluid mass or slave mass that extends well into liquid 14, i.e., between open end 32 of tube 30 and surface 16. The reaction of the slave mass provided by liquid 14 works against the compressible gas damper defined by gas 34. The slave mass is a reaction mass that couples piston 33 to liquid 14. Using the fundamental laws of Newtonian physics and the conservation of mass equations (e.g., Lagrangian or Eulerian methods of analyses with Computational Fluid Dynamics or Finite Element Approaches), the volume and diameter of tube 30 are designed to create a slave mass within liquid 14 of a desired magnitude that resonates at a desired frequency (i.e., the frequency that is to be damped) thereby coupling the compressible gas damper to liquid 14.

Figure 5:
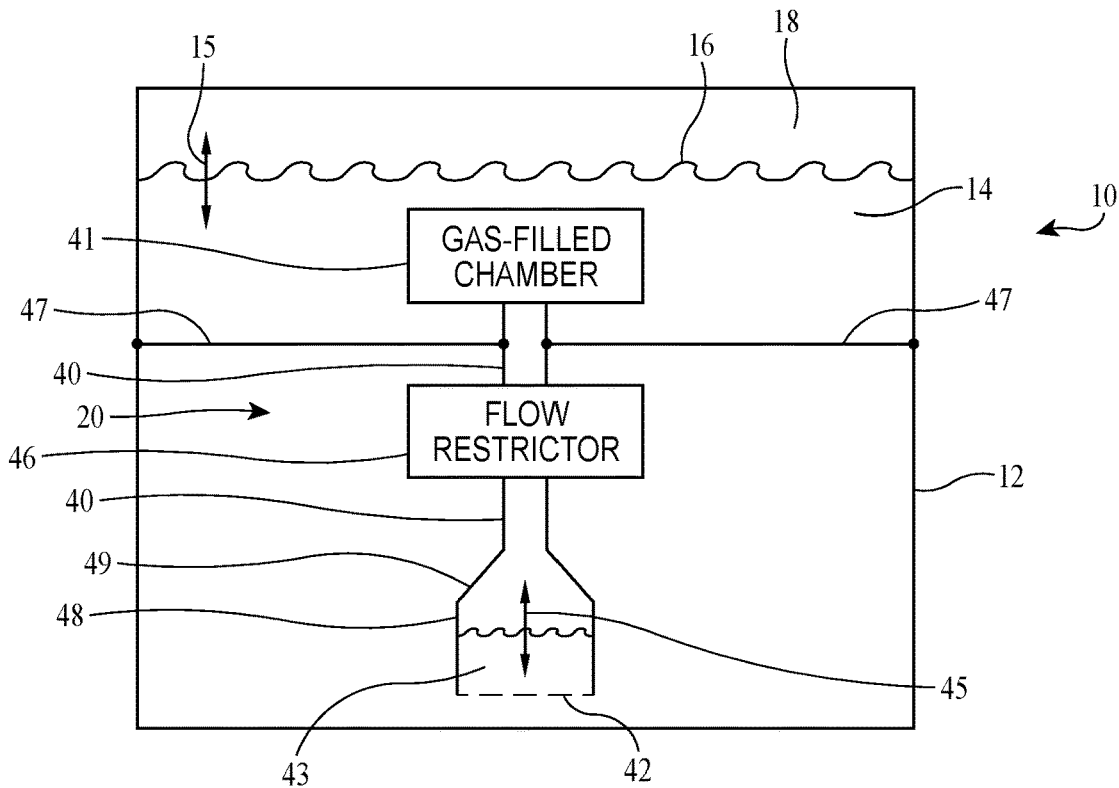
FIG. 5 is an isolated schematic view of a single motion absorber employing a varying-diameter tube disposed in the absorber's liquid in accordance with another embodiment of the present invention.

Referring next to FIG. 5, another embodiment of a tube-based elastic element 20 is illustrated. In the FIG. 5 embodiment, elastic element 20 includes several design options that allow it to be tuned throughout an extended frequency range. A relatively small-diameter tube 40 has its closed end defined by a sealed gas-filled chamber 41 and has its open end 42 sealed by a piston 43 of liquid 14. A gas 44 fills the region of tube 40 between piston 43 and gas chamber 41. Similar to the embodiment described in FIG. 4, piston 43 moves up and down in opposition to the corresponding movement of surface 16 as indicated by two-headed arrow 45. A flow restrictor 46 can be disposed in tube 40. The elastic element can be supported in container 12 by means of supports 47.

The combination of gas-filled chamber 41 and flow restrictor 46 enhances the tunability of the motion absorber. Gas-filled chamber 41 acts as a pneumatic spring, while flow restrictor 46 limits the gas flow rate in and out of gas-filled chamber 41. The volume of gas-filled chamber 41 can be used to control the compressible pneumatic spring rate to adjust the natural frequency of the elastic element, while flow restrictor 46 determines inherent damping. Flow restrictor 46 can be positioned at any point along the internal gas flow path depending upon the performance objectives and the actual architecture of the embodiment. The relatively small diameter tube 40 can be sized to allow elastic element 20 to function as a Helmholtz resonator to control the frequency of the primary damping mass. The principle advantage of this design feature is that the high velocity gas inscribed by the smaller diameter of tube 40 functions as an additional mass term to thereby reduce the elastic element's resonant frequency.

The diameter and length of tube 40 can be varied to adjust the dynamic response characteristics of the elastic element. For example, an expanded diameter chamber or diffuser 48 coupled with a gas velocity amplifier 49 can be provided adjacent to piston 43. The velocity of gas 44 inside tube 40 is controlled by the displacement of piston 43 and the ratio of the cross-sectional area of diffuser 48 as compared to the cross-sectional area of tube 40. The expanded region of diffuser 48 can also be used to increase the mass of the fluid contained in open end 42 thereby increasing the cross-sectional area of piston 43 and gas velocity inside tube 40.

Figure 6:
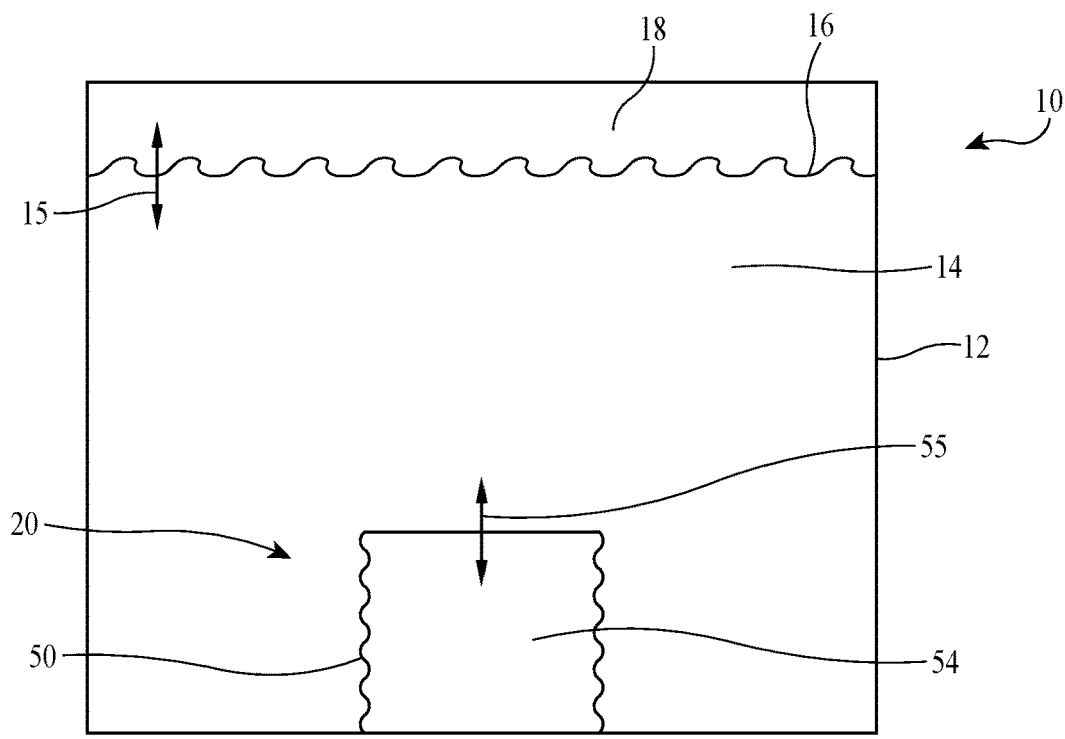
FIG. 6 is an isolated schematic view of a single motion absorber employing a bellows disposed in the absorber's liquid and coupled to the absorber's container in accordance with another embodiment of the present invention.

The present invention is not limited to tube-type elastic elements. For example, FIG. 6 illustrates a motion absorber 10 utilizing a sealed bellows 50 disposed in liquid 14 and coupled to container 12. A gas 54 could be sealed within bellows 50 to contribute to the spring force provided by the bellows structure. In other embodiments, the bellows could be evacuated so that the stiffness of the bellows itself and/or internally-positioned springs provided the spring force. In still other embodiments, a combination of gas, the bellows itself, and internal springs could provide the spring force. The one or more bellows 50 could be mounted on the bottom and/or sides of container 12. As liquid surface 16 moves up and down as indicated by two-headed arrow 15, bellows 50 experiences expansion and compression, respectively, as indicated by two-headed arrow 55. Such expansion and compression leverages the slave mass provided by liquid 14 to damp the motion of liquid 14. An arrangement of multiple bellows 50 in container 12 could be designed to capture a slave mass of liquid 14 that is constant and independent of the motion of liquid 14 in container 12.

Figure 7:
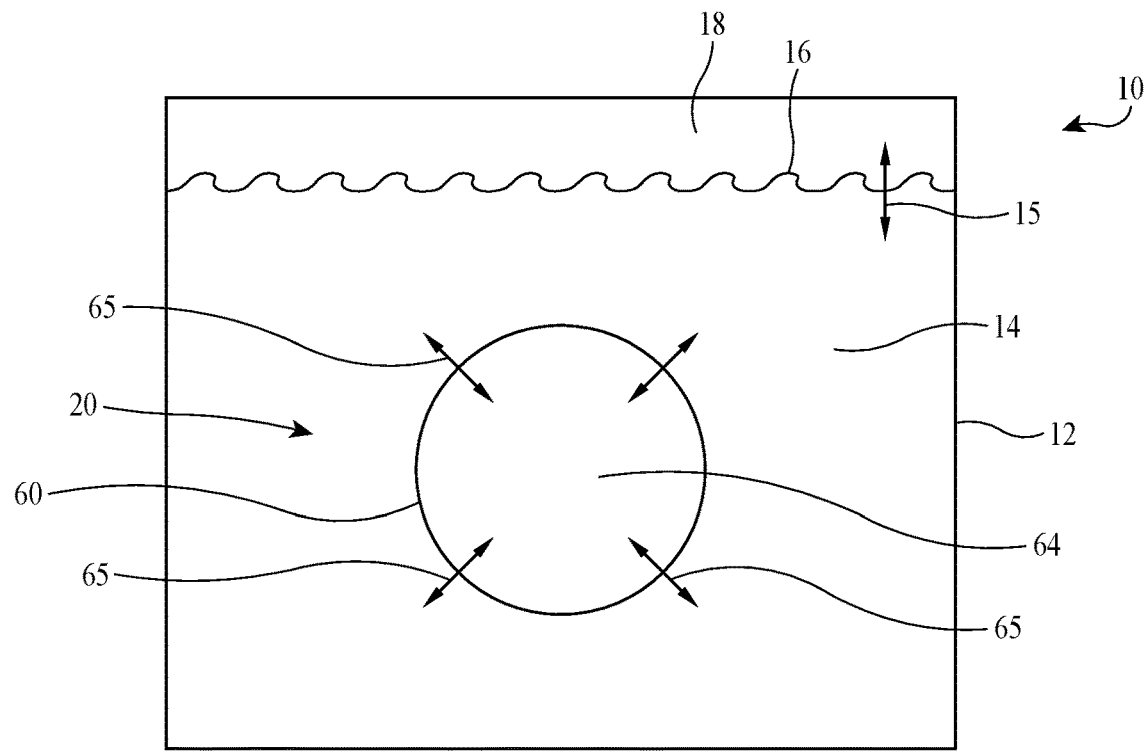
FIG. 7 is an isolated schematic view of a single motion absorber employing a balloon disposed in the absorber's liquid in accordance with another embodiment of the present invention.

FIG. 7 illustrates another motion absorber 10 in accordance with the present invention that employs a balloon filled with a gas 64. Balloon 60 can be coupled to container 12 or can be configured for neutral buoyancy within liquid 14 as shown. Regardless of whether liquid surface 16 moves up and down or side-to-side, balloon 60 is able to experience expansion and compression in a variety of dimensions as indicated by two-headed arrows 65.

It is to be understood that a variety of other types of elastic elements can be employed in motion absorbers of the present invention. For example, the elastic element can be constructed using flexible membranes or rolling diaphragms.

Figure 8:
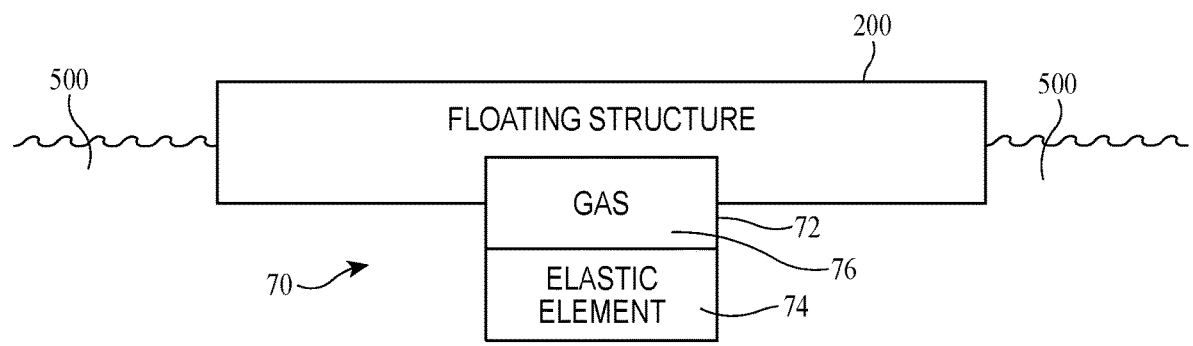
FIG. 8 is a schematic view of a motion absorbing system for a floating structure configured to have the motion absorber's elastic element in fluid communication with a surrounding body of water in accordance with another embodiment of the present invention.
Figure 9:
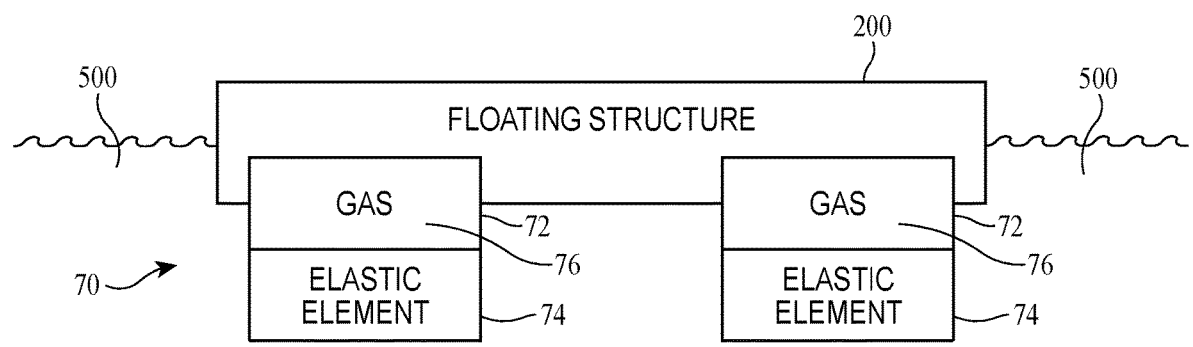
FIG. 9 is a schematic view of a motion absorbing system for a floating structure configured to have the elastic elements from multiple motion absorbers in fluid communication with a surrounding body of water in accordance with another embodiment of the present invention.

For some applications, it may be possible for the motion absorbing system of the present invention to leverage a very large slave mass provided by the environment in which a structure resides. For example, structures designed to float on a body of water can be configured with one or more motion absorbers that leverage the surrounding body of water as the absorber's slave mass. Accordingly, FIG. 8 illustrates a floating structure 200 disposed on a body of water 500 with a single motion absorber 70 coupled to structure 200, and FIG. 9 illustrates the use of multiple motion absorbers 70 coupled to floating structure 200. In each case, motion absorbers 70 can be configured for coupling to an existing floating structure, or can be configured for integration into a floating structure during its initial design/construction.

Motion absorber 70 includes a container 72 coupled to floating structure 200 and an elastic element 74 supported by and within container 72. Elastic element 74 is in fluid communication with body of water 500 and entraps a volume of gas 76 within container 72. Water movement in water 500 acting on elastic element 74 causes the elastic element to compress gas 76 or allow it to expand within container 76 thereby causing a pressure change in gas 76. In all embodiments of absorber 70, the mass of elastic element is minimized thereby minimizing its parasitic contribution to the dynamic system. At the same time, the minimized-mass elastic element 74 leverages a very large, non-parasitic slave mass in water 500.

Figure 10:
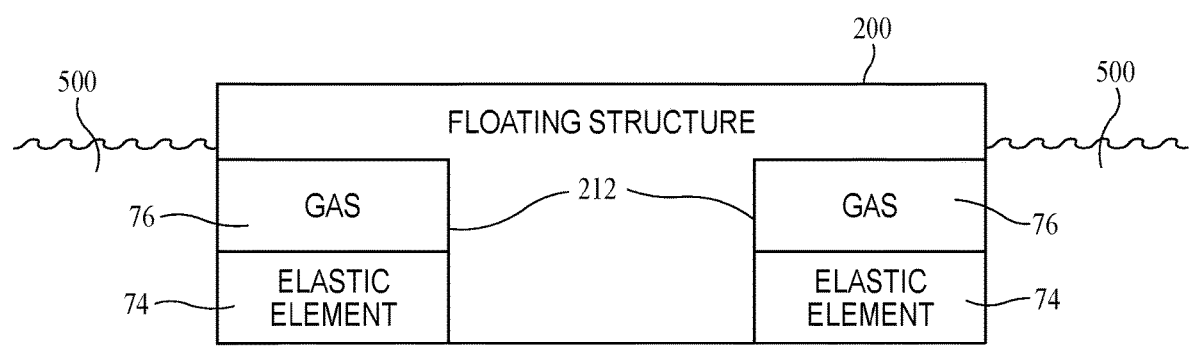
FIG. 10 is a schematic view of a motion absorbing system for a floating structure whose multiple ballast tanks are configured as multiple motion absorbers in fluid communication with a surrounding body of water in accordance with another embodiment of the present invention.
Figure 11:
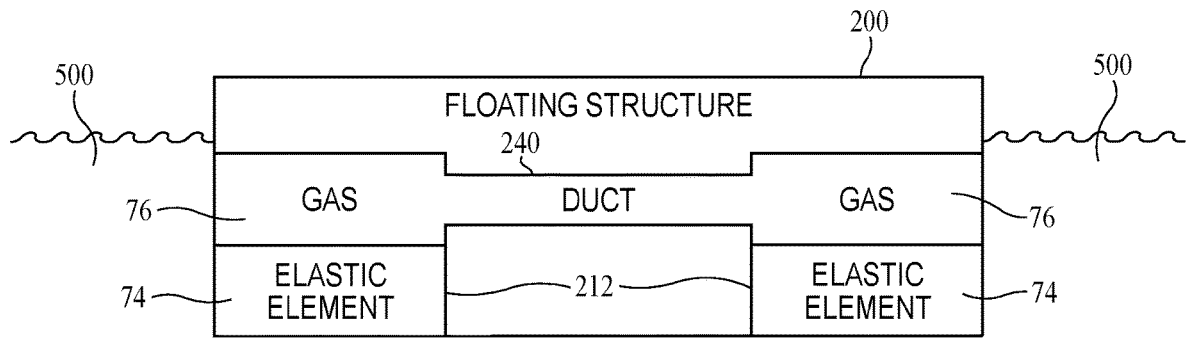
FIG. 11 is a schematic view of a motion absorbing system for a floating structure whose multiple ballast tanks are configured as multiple motion absorbers in fluid communication with a surrounding body of water and whose multiple motion absorbers are further configured for fluid communication therebetween in accordance with another embodiment of the present invention.

The present invention can be incorporated into existing floating structures utilizing ballast tanks as illustrated in FIG. 10 where ballast tanks 212 function as the above-described container 72 of a motion absorber. Elastic element 74 is positioned in a ballast tank 212 to be in fluid communication with body of water 500 and to entrap gas 76 in ballast tank 212. When multiple motion absorbers are to be linked in a floating structure, FIG. 11 illustrates a duct 240 to provide fluid communication between two or more volumes of gas 76 to thereby couple the two or more motion absorbers.

Elastic element 74 used in motion absorber 70 can be constructed in a variety of ways without departing from the scope of the present invention. Several non-limiting examples are shown in FIGS. 12-15 and will be described below. In each example, a single motion absorber 70 is shown in isolation.

Figure 12:
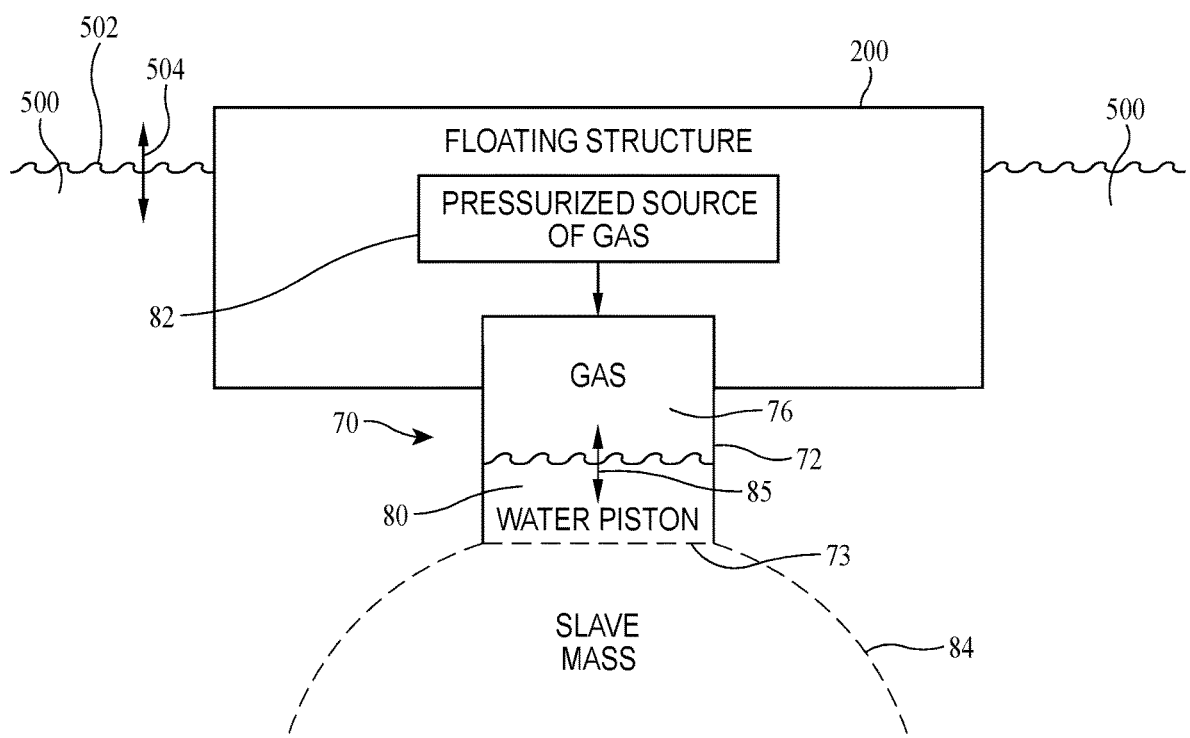
FIG. 12 is a schematic view of a motion absorbing system for a floating structure that employs a water piston at the open end of the motion absorber that is in fluid communication with the surrounding body of water in accordance with an embodiment of the present invention.

Referring first to FIG. 12, container 72 is open at its end 73 disposed in water 500 such that the absorber's elastic element includes a piston 80 of water 500 that seals open end 73 thereby entrapping gas 76 in container 72. As the surface 502 of water 500 moves up and down (due to wind, current, and/or wave action) as indicated by two-headed arrow 504, water piston 80 moves up and down in container 72 as indicated by two-headed arrow 85 as the gas 76 acts as a spring on piston 80. Since water piston 80 is contiguous with water 500, piston 80 leverages a large mass of water 500 as the slave mass 84 of the elastic element. If the elastic element is designed to minimize the mass of water piston 80, the parasitic weight impact of motion absorber 70 is minimal on floating structure 200. A pressurized source of gas 82 can be provided for tuning of motion absorber 70 by altering the spring force provided by gas 76.

Figure 13:
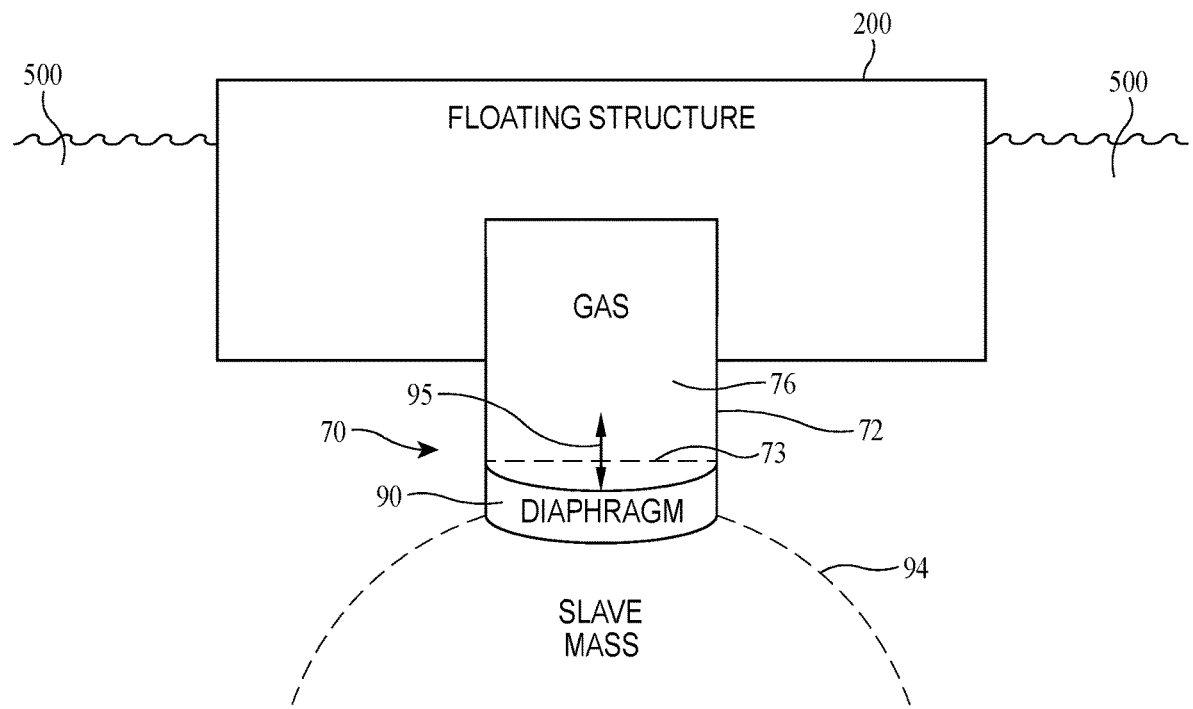
FIG. 13 is a schematic view of a motion absorbing system for a floating structure that employs an elastic diaphragm at the open end of the motion absorber that is in fluid communication with the surrounding body of water in accordance with another embodiment of the present invention.

Referring now to FIG. 13, another embodiment of motion absorber 70 is illustrated in which a flexible diaphragm 90 is used to seal the open end 73 of container 72 disposed in water 500. The entrapped volume of gas 76 applies a spring force to diaphragm 90 as it flexes (as indicated by two-headed arrow 95) into and out of container 72 in accordance with the movement of water 500. Once again, the motion absorber's slave mass 94 is provided by water 500. Diaphragm 90 can be realized by a variety of constructions to include rolling diaphragms, flexible membranes, etc., without departing from the scope of the present invention.

Figure 14:
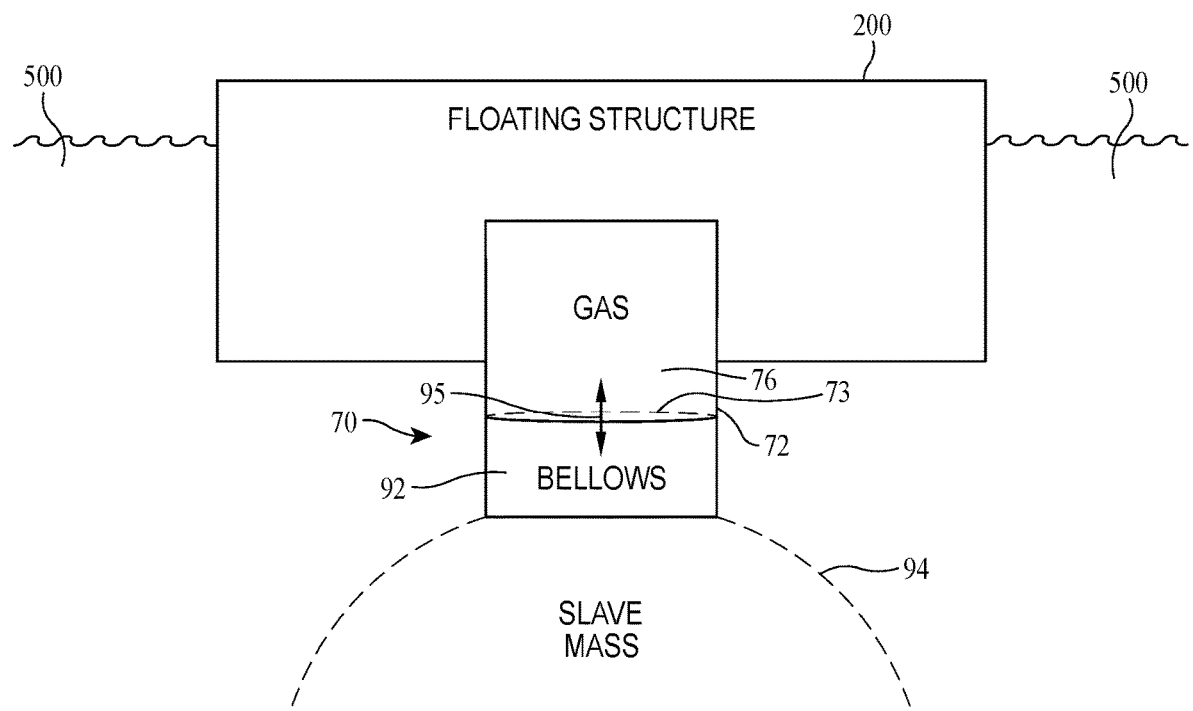
FIG. 14 is a schematic view of a motion absorbing system for a floating structure that employs a bellows at the open end of the motion absorber that is in fluid communication with the surrounding body of water in accordance with another embodiment of the present invention.
Figure 15:
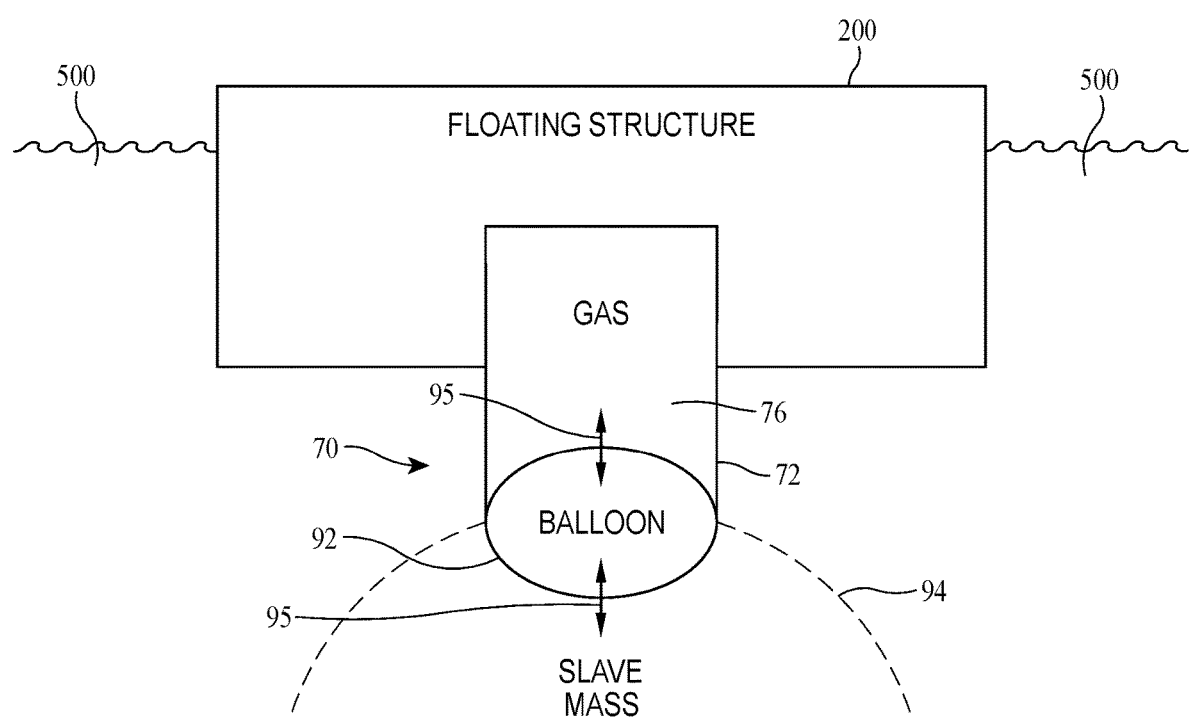
FIG. 15 is a schematic view of a motion absorbing system for a floating structure that employs a balloon at the open end of the motion absorber that is in fluid communication with the surrounding body of water in accordance with another embodiment of the present invention.

Other types of flexible devices can be used at the open end of container 72 for fluid communication with body of water 500. For example, FIG. 14 illustrates a bellows 92 to seal open end 73 of container 72, while FIG. 15 illustrates a balloon 96 to seal open end 73 of container 72. In both case, the flexible devices leverage a large slave mass 94 from the surrounding body of water 500.

The various embodiments of the present invention are particularly well-suited for use in "floating offshore wind turbine" (FOWT) platforms. Exemplary applications of the present invention to FOWT platforms are illustrated in FIGS. 16-27 and will be described further below.

The embodiments of the invention disclosed below generally provide improvements to various types of FOWT platforms, such as barge type platforms, submersible or semi-submersible type platforms, spar buoy type platforms, and tension leg type platforms. The invention includes a FOWT platform with an improved tuned mass damper system to reduce motion and loading during operation.

As used herein, the term parallel is defined as in a plane substantially parallel to the horizon. The term vertical is defined as substantially perpendicular to the plane of the horizon.

Figure 16:
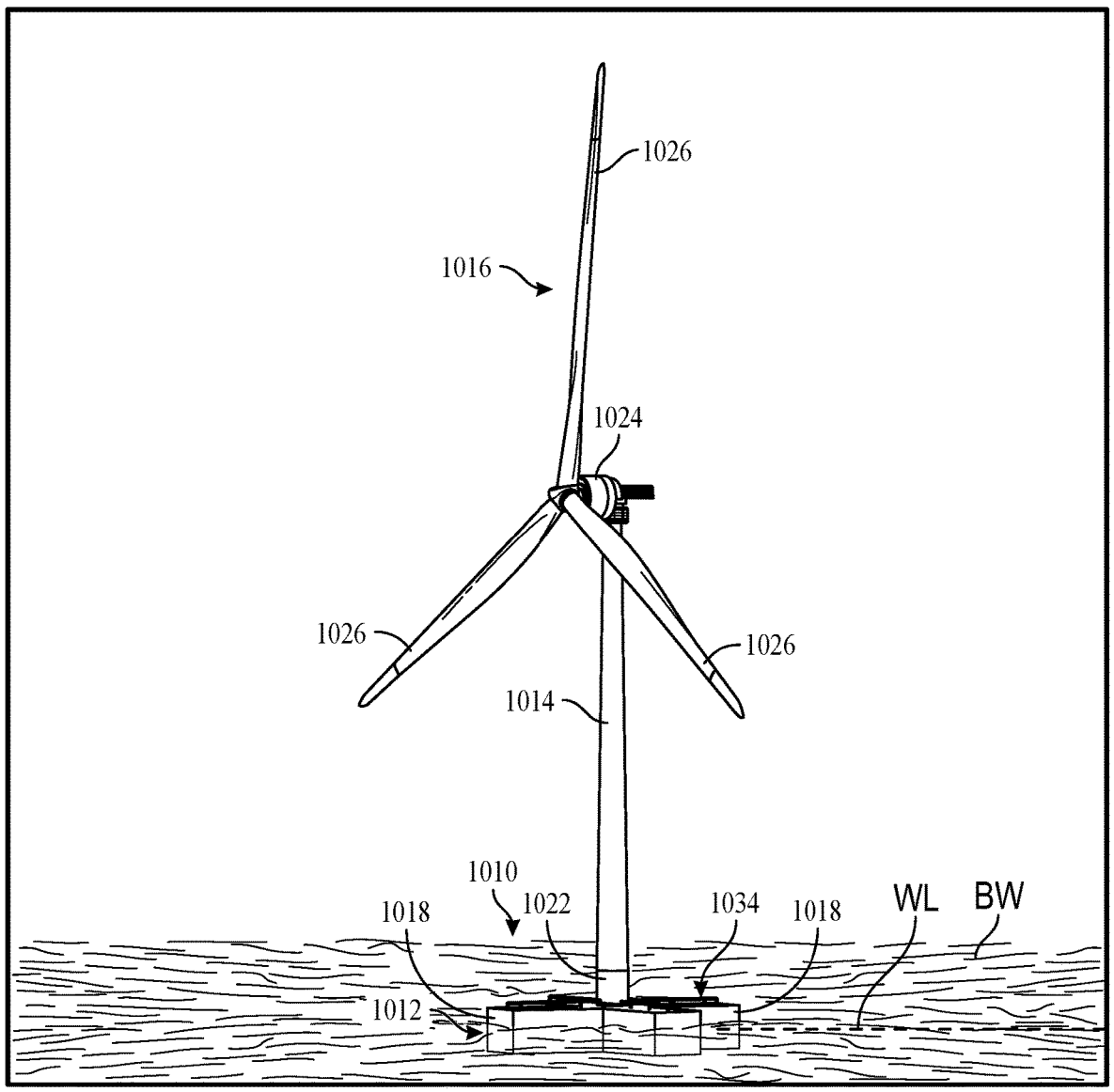
FIG. 16 is a perspective view of a floating offshore wind turbine (FOWT) platform with a wind turbine mounted thereon and having an improved tuned mass damper (TMD) system in accordance with this invention.
Figure 17:
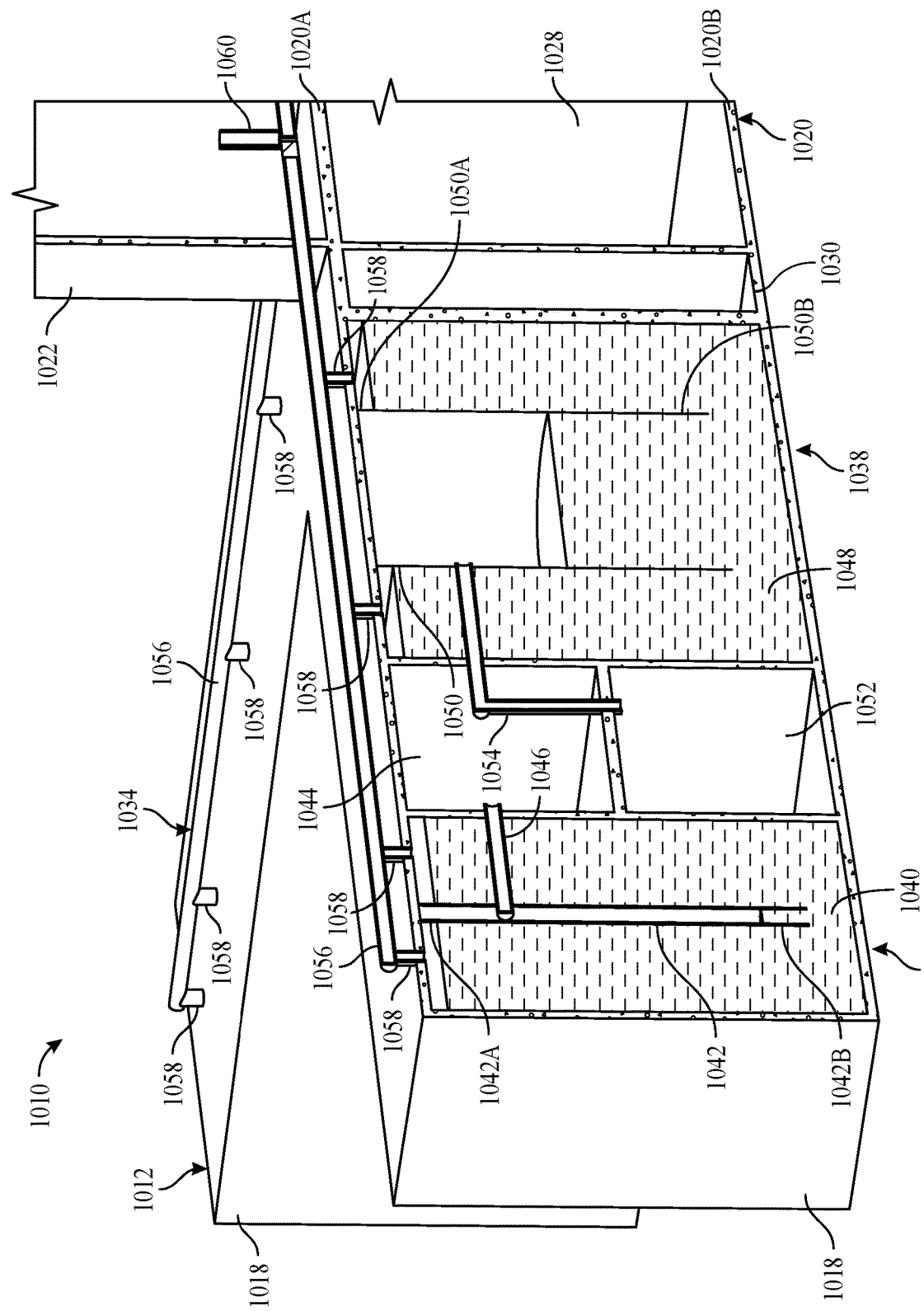
FIG. 17 is an enlarged view of a portion of the FOWT platform illustrated in FIG. 16, partially in cross-section.
Figure 18:
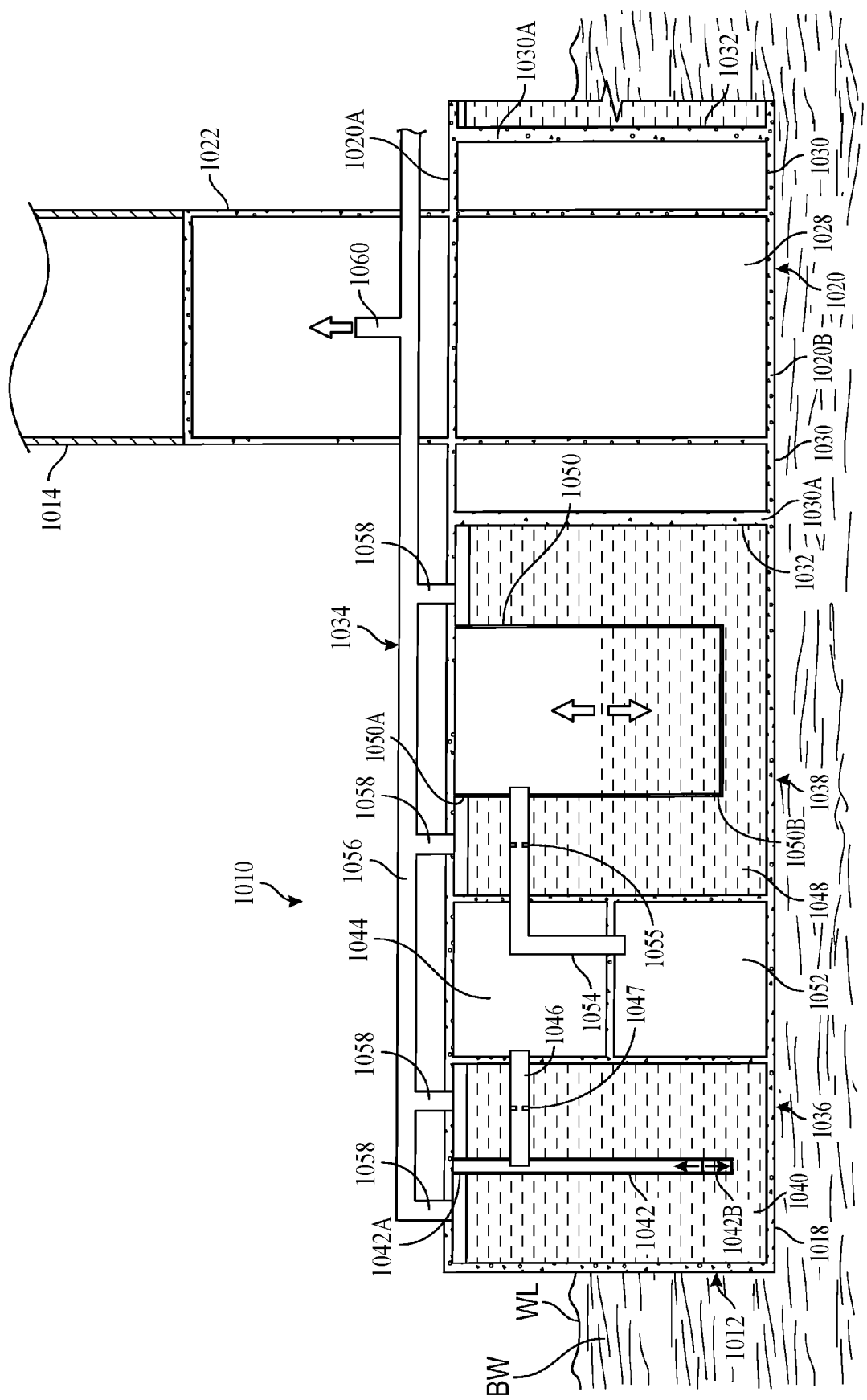
FIG. 18 is an alternate cross-sectional view of the FOWT platform illustrated in FIGS. 16 and 17.

Referring to the drawings, particularly to FIGS. 16 through 18, a first embodiment of a FOWT platform 1010 having an improved tuned mass damper (TMD) system 1034 is shown deployed in a body of water BW and anchored to the seabed (not shown). The illustrated FOWT platform 1010 is one embodiment of a barge type platform and includes a foundation or hull 1012 that supports a tower 1014. The tower 1014 supports a wind turbine 1016. The hull 1012 is semi-submersible, and is structured and configured to float, semi-submerged, in the body of water BW. Accordingly, a portion of the hull 1012 will be above water when the hull 1012 is floating in the body of water BW. As shown, a portion of the hull 1012 is below the waterline WL. As used herein, the waterline WL is defined as the approximate line where the surface of the water meets the FOWT platform 1010. Conventional mooring lines (not shown) may be attached to the FOWT platform 1010 and further attached to anchors (not shown) in the seabed (not shown) to limit to movement of the FOWT platform 1010 on the body of water BW.

As shown in the illustrated embodiment, the hull 1012 is formed from four hull legs 1018 that extend radially outwardly from a keystone 1020 and provide buoyancy. The hull 1012 is thus substantially cross-shaped. An interior or center column 1022 is mounted to the keystone 1020, and provides a platform upon which the tower 1014 is mounted. Alternatively, the hull 1012 may include three hull legs 1018 or more than four hull legs 1018. In the illustrated embodiment, the hull legs 1018 have a length within the range of about 10 m to about 75 m depending on the size of commercial wind turbine installed.

Although the hull 1012 of the barge type FOWT platform 1010 is cross shaped, it will be understood that the improved TMD system 1034 may be used in barge type platforms having other hull shapes, including but not limited to hulls having rectangular, square, round, oval, and other geometric shapes.

In the embodiments illustrated herein, the wind turbine 1016 is a horizontal-axis wind turbine. Alternatively, the wind turbine may be a conventional vertical-axis wind turbine (not shown). The size of the turbine 1016 will vary based on the wind conditions at the location where the FOWT platform 1010 is anchored and the desired power output. For example, the turbine 1016 may have an output of about 10 MW. Alternatively, the turbine 1016 may have an output within the range of from about 1 MW to about 20 MW.

The wind turbine 1016 may be conventional and may include a rotatable hub 1024. At least one rotor blade 1026 is coupled to and extends outward from the hub 1024. The hub 1024 is rotatably coupled to an electric generator (not shown). The electric generator may be coupled via a transformer (not shown) and an underwater power cable (not shown) to a power grid (not shown). In the illustrated embodiment, the hub 1024 has three rotor blades 1026. In other embodiments, the hub 1024 may have more or less than three rotor blades 1026.

As shown in FIGS. 17 and 18, the keystone 1020 includes an upper wall 1020A defining an upper surface, a lower wall 1020B, and further defines a central cavity 1028 with four radially outwardly extending keystone legs 1030. Each leg 1030 includes an end wall 1030A defining a substantially vertical connection face 1032 to which the four hull legs 1018 will be attached. Alternatively, the keystone 1020 may include three keystone legs 1030 or more than four keystone legs 1030, corresponding with the number of hull legs 1018.

A conventional TMD is a mechanism integrated with a dynamic body that uses an internal or external mass and is linked to the dynamic body via a spring and a damper. The damper is used to reduce unwanted responses in the dynamic body by setting the damper to respond out of phase and at the frequency of the unwanted response, a procedure typically referred to as a tuned mass damping. The natural frequency of the TMD may be tuned by selecting a combination of mass and stiffness for the connection between the damper and the dynamic body. The phase of the damper may be tuned by adjusting the damping in the linkage between the mass damper and the dynamic body. Advantageously, the embodiments of the TMD described and illustrated herein use existing water in water ballast chambers in the hull, for example in the hull legs 1018 or water external to the hull legs 1018, as the mass, pressurized air as the spring, and an orifice configured for tuned damping.

The improved TMD system 1034, illustrated in FIGS. 16 through 18, includes a first or low frequency TMD 1036 and a second or high frequency TMD 1038. The low frequency TMD 1036 is formed at an outboard end of each of the hull legs 1018 and includes a first water ballast chamber 1040 having a centrally located and longitudinally extending first damper pipe 1042 extending from an upper end of the first water ballast chamber 1040 toward a lower end of the first water ballast chamber 1040, but terminating above a floor of the first water ballast chamber 1040.

The first damper pipe 1042 may have a diameter within the range of about 1 m to about 20 m, a closed first end 1042A (the upper end when viewing FIGS. 17 and 18), and an open second end 1042B (the lower end when viewing FIGS. 17 and 18). A low frequency pressure chamber 1044 is located in the hull leg 1018. In the illustrated embodiment, the low frequency pressure chamber 1044 is located adjacent the first water ballast chamber 1040. Alternatively, the low frequency pressure chamber 1044 may be located at other desired locations in the hull leg 1018. A first connecting pipe 1046 extends between the low frequency pressure chamber 1044 and an upper portion of the first damper pipe 1042.

Similarly, the high frequency TMD 1038 is formed at an inboard end of each of the hull legs 1018 and includes a second water ballast chamber 1048 having a centrally located and longitudinally extending second damper pipe 1050 extending from an upper end of the toward a lower end of the second water ballast chamber 1048, but terminating above a floor of the second water ballast chamber 1048. The second damper pipe 1050 may have a diameter significantly larger than the diameter of the first damper pipe 1042, such as within the range of about 1 m to about 20 m, a closed first end 1050A (the upper end when viewing FIGS. 17 and 18), and an open second end 1050B (the lower end when viewing FIGS. 17 and 18). A high frequency pressure chamber 1052 is also located in the hull leg 1018. In the illustrated embodiment, the high frequency pressure chamber 1052 is located adjacent the second water ballast chamber 1048 and below the first water ballast chamber 1040. Alternatively, the high frequency pressure chamber 1052 may be located at other desired locations in the hull leg 1018. A second connecting pipe 1054 extends between the high frequency pressure chamber 1052 and an upper portion of the second damper pipe 1050.

A ventilation pipe 1056 is mounted to an upper, outside surface of each hull leg 1018. Each ventilation pipe 1056 has a plurality of connecting ventilation pipes 1058 connecting each of the first water chambers 1040 and the second water chambers 1048, and each ventilation pipe 1056 terminates at an open end thereof within the center column 1022. In the illustrated embodiment, two connecting ventilation pipes 1058 are connected to, and in communication with, each of the first water chambers 1040 and the second water chambers 1048. Inboard ends of the ventilation pipes 1056 are connected to a central vent hub 1060 within the center column 1022. The ventilation pipes 1056 and connecting ventilation pipes 1058 vent each of the first water chambers 1040 and the second water chambers 1048 to the atmosphere.

Air pressure within the low frequency pressure chamber 1044 and the high frequency pressure chamber 1052 may be within the range of about 1.0 psi to about 50.0 psi, although preferably, the air pressure within the high frequency pressure chamber 1052 is greater than the air pressure within the low frequency pressure chamber 1044. The air pressure within each of the low frequency pressure chamber 1044 and the high frequency pressure chamber 1052 is customizable, and may be set and changed by an air compressor (not shown) within the FOWT platform 1010.

The first water chambers 1040 and the second water chambers 1048 may be in fluid communication with a ballast pump (not shown) or other means for pumping or moving water, thus allowing the first water chambers 1040 and the second water chambers 1048 to be filled with water, and for the volume of water therein to be changed as required.

The first connecting pipe 1046 and the second connecting pipe 1054 may be provided with adjustable orifices, schematically illustrated at 1047 and 1055, respectively, within each of the first connecting pipe 1046 and the second connecting pipe 1054. Inside diameters of the adjustable orifices 1047 and 1055 may adjusted as required, i.e., either made larger or smaller, for active control of the flow of pressurized air from the low frequency pressure chamber 1044 to the first damper pipe 1042, and from the high frequency pressure chamber 1052 to the second damper pipe 1050. The adjustable orifices 1047 and 1055 may be manually or remotely adjusted. Thus, a desired frequency may be maintained within the low frequency TMD 1036 and the high frequency TMD 1038. For example, the frequency within the low frequency pressure chamber 1044 and the high frequency pressure chamber 1052 is preferably within the range of about 0.03 Hz to about 0.33 Hz. Preferably, a frequency of the high frequency TMD 1038 is greater than a frequency of the low frequency TMD 1036. Thus the damping characteristics of the high frequency TMD 1038 and the low frequency TMD 1036 may be controlled and adjusted by changing the rate of air flow through the second connecting pipe 1054 and the first connecting pipe 1046, respectively.

More specifically, the TMDs 1036 and 1038 may each be actively controlled to mitigate the adverse effects of FOWT platform motion and loading resulting from wind, current, and wave loading during operation over a range of frequencies.

For example, the TMD system 1034 may be provided with a controller mounted at any desired location in the FOWT platform 1010. Preferably, a controller provided as a component of the wind turbine 1016 is used as the TMD 1034 controller. It will be understood however, that the controller used to control operation of the TMD system 1034 may be independent of the wind turbine 1016 controller.

Referring again to FIG. 18, the adjustable orifices 1047 and 1055 may be equipped with a sensor, such as a position sensor, configured to sense the size of the orifices 1047 and 1055 during operation, and communicate the sensed position to the controller. Alternatively, other types of sensors may be used, including but not limited to a fluid flow sensor to measure fluid flow through the orifices 1047 and 1055 during operation, and communicate the sensed fluid flow to the controller. Each of the low frequency pressure chamber 1044 and the high frequency pressure chamber 1052 may be equipped with a pressure sensor configured to sense the air pressure in the pressure chambers 1044 and 1052 during operation, and communicate the sensed pressures to the controller.

Further, the hull 1012 may include an array of sensors configured to sense a change of sea state and communicate the sensed sea state change to the controller. Examples of sea state sensors that may be provided on the hull 1012 include, but are not limited to accelerometers, inclinometers and other angular position sensors, and load cells. Data from this array of sea state change sensors is communicated to the controller. An algorithm within the controller analyzes the data received and then: (1) changes a stiffness of the TMDs 1036 and 1038 by changing the air pressure in the pressure chambers 1044 and 1052, respectively, and/or (2) changes a damping frequency of the TMDs 1036 and 1038 by changing the size of the orifices 1047 and 1055, respectively, thus changing a volume of air flow through the first connecting pipe 1046 and the second connecting pipe 1054.

In operation, each of the low frequency TMD 1036 and the high frequency TMD 1038 may be tuned based on the geometry of the FOWT hull and the desired frequencies for which it is desirable to mitigate. Advantageously, the TMD system 1034 of the FOWT platform 1010 may be used to mitigate motions at two or more frequencies. As best shown in FIG. 18, a desired air pressure may be established in the low frequency pressure chamber 1044 of the low frequency TMD 1036. This desired air pressure will be communicated to the first damper pipe 1042 via the first connecting pipe 1046 and thus determines a level of water within the first damper pipe 1042. The water in the first damper pipe 1042 urges against the pressurized air in the first damper pipe 1042, and thus acts like a spring. Because the low frequency TMD 1036 is formed at an outboard end of each of the hull legs 1018, and is oriented vertically, it provides greater leverage and is more effective to mitigate heeling, or the reduction of rotational movement of the hull 1012.

Similarly, a desired air pressure may be established in the high frequency pressure chamber 1052 of the high frequency TMD 1038. This desired air pressure will be communicated to the second damper pipe 1050 via the second connecting pipe 1054 and thus determines a level of water within the second damper pipe 1050. The water in the second damper pipe 1050 urges against the pressurized air in the second damper pipe 1050, and thus acts like a spring. Because the high frequency TMD 1038 is formed at an inboard end of each of the hull legs 1018, and is oriented vertically, it is more effective to mitigate up and down motion, i.e., vertical motion of the hull 1012.

Figure 19:
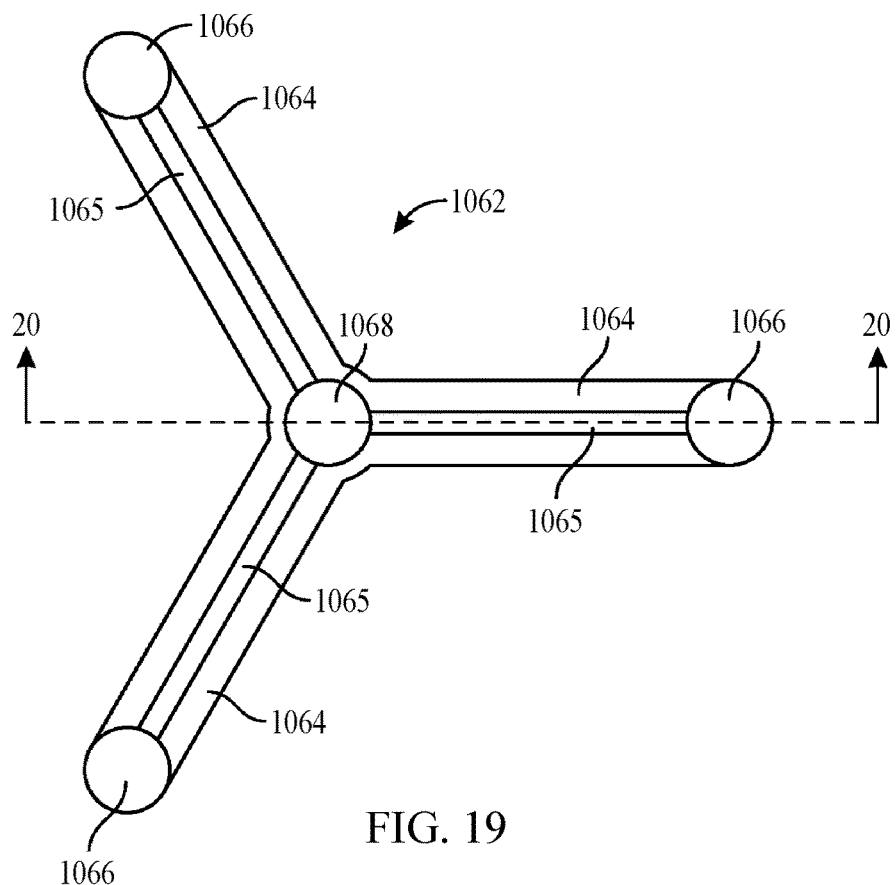
FIG. 19 is a top plan view of a semi-submersible FOWT platform having a second embodiment of the improved TMD system in accordance with this invention.
Figure 20:
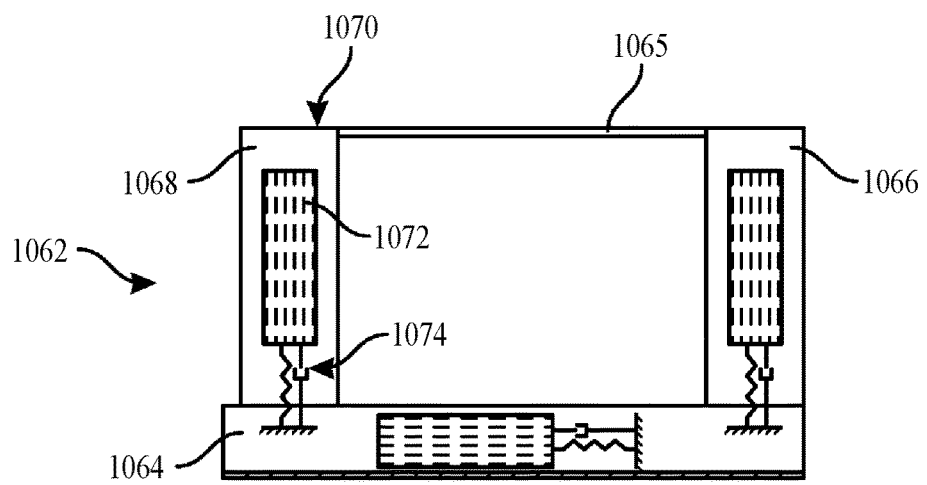
FIG. 20 is a cross-sectional view taken along the line 20-20 of FIG. 19.

FIGS. 19 and 20 illustrate a semi-submersible FOWT platform 1062 having a second embodiment of the improved TMD system, shown schematically at 1070. The semi-submersible FOWT platform 1062 includes three buoyant beams 1064, a vertical outer column 1066 at an outboard end of each of the beams 1064 and a vertical center column 1068 at a center of the FOWT platform 1062. Upper beams 1065 may extend between an upper end of the center column 1068 and an upper end of each of the outer columns 1066. As illustrated in FIG. 20, the TMD system 1070 includes a water chamber 1072 and a pressure chamber having an orifice damper 1074. In the illustrated embodiment, each of the beams 1064 has a horizontally oriented TMD system 1070 therein, and each of the columns 1066 and 1068 has a vertically oriented TMD system 1070 therein.

Figure 21:
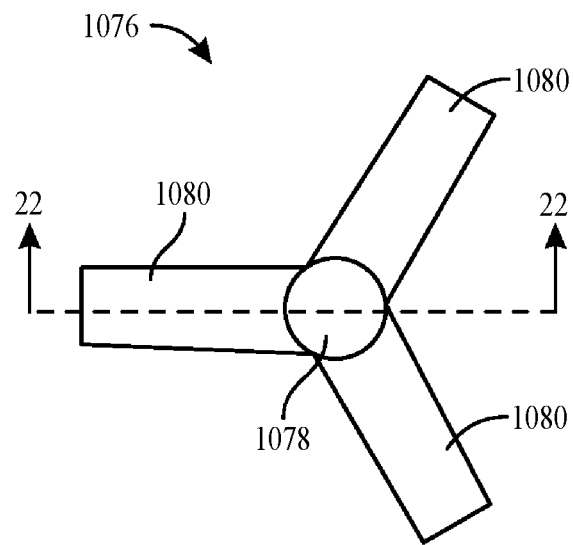
FIG. 21 is a top plan view of a tension leg FOWT platform having a third embodiment of the improved TMD system in accordance with this invention.
Figure 22:
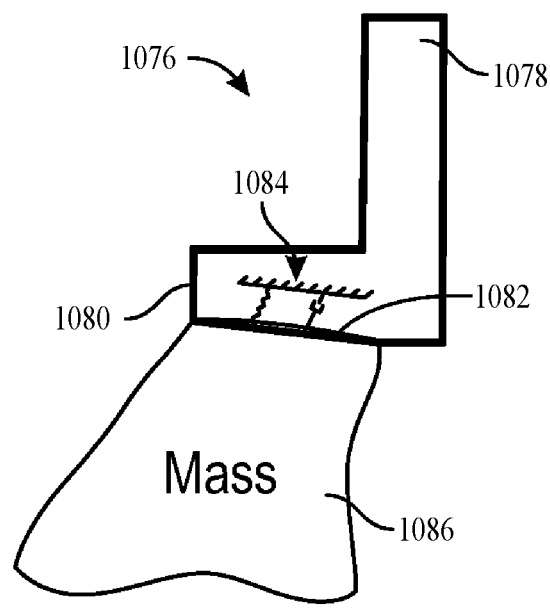
FIG. 22 is a cross-sectional view taken along the line 22-22 of FIG. 21.

FIGS. 21 and 22 illustrated a tension leg FOWT platform 1076 having a third embodiment of the improved TMD system, shown schematically at 1084. The tension leg FOWT platform 1076 includes three buoyant beams 1080, and a vertical center column 1078 at a center of the FOWT platform 1076. A flexible and water impermeable diaphragm 1082 is formed in a lower surface of each beam 1080 and is in contact with water 1086 in which the tension leg FOWT platform 1076 is deployed. As illustrated in FIG. 22, the TMD system 1084 includes the diaphragm 1082 and a pressure chamber having an orifice damper 1084. In lieu of a water chamber, the water 1086 acting against the diaphragm 1082 functions as the mass for the TMD 1084. The diaphragm 1082 is movable in response to air pressure in the pressure chamber 1084. In the illustrated embodiment, each of the beams 1080 has a vertically oriented TMD system 1084 therein.

Figure 23:
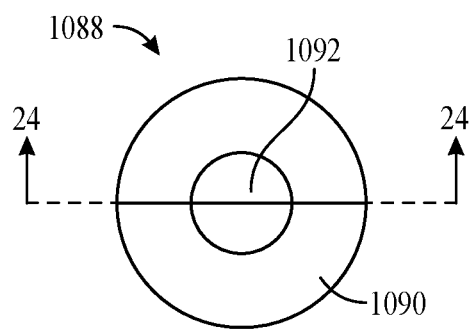
FIG. 23 is a top plan view of a spar type FOWT platform having a fourth embodiment of the improved TMD system in accordance with this invention.
Figure 24:
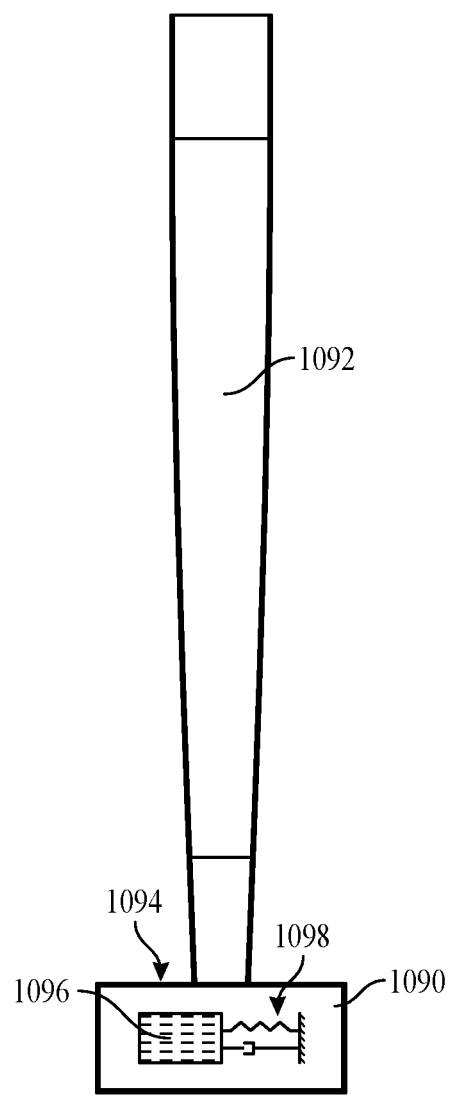
FIG. 24 is a cross-sectional view taken along the line 24-24 of FIG. 23.

FIGS. 23 and 24 illustrate a spar type FOWT platform 1086 having a fourth embodiment of the improved TMD system, shown schematically at 1094. The spar type FOWT platform 1086 includes a base 1090 and a vertical mast 1092 extending outwardly and upwardly therefrom. As illustrated in FIG. 24, the TMD system 1094 is substantially the same as the TMD system 1070 and includes a water chamber 1096 and a pressure chamber having an orifice damper 1098. In the illustrated embodiment, TMD system 1094 is horizontally oriented within the base 1090.

Figure 25:
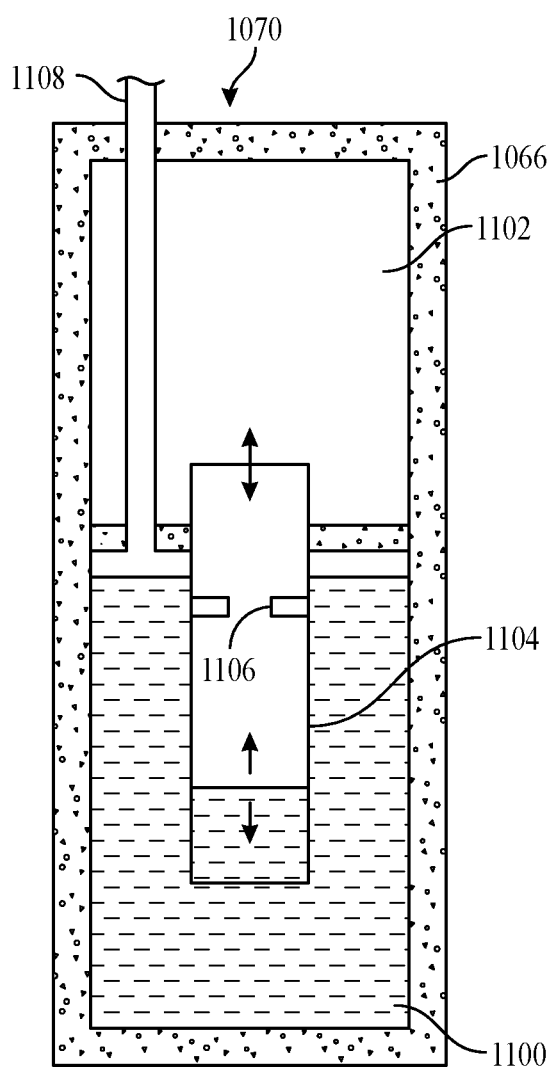
FIG. 25 is an enlarged cross-sectional view of the second embodiment of the improved TMD system shown in FIGS. 19 and 10.

Referring now to FIG. 25, one example of the TMD system 1070 is shown. The TMD system 1070 is shown within a vertical outer column 1066. It will be understood however, that the TMD system 1070 may be formed in any of the beams 1064 and the vertical center column 1068. The TMD system 1070 includes a ballast water chamber 1100 and pressure chamber 1102. A damper pipe 1104 extends between the ballast water chamber 1100 and the pressure chamber 1102 and has an orifice defining an orifice damper 1106 formed therein for controlling an amount of pressurized air within the damper pipe 1104. The damper pipe 1104 may have a diameter within the range of about 1 m to about 20 m.

A ventilation pipe 1108 extends between the ballast water chamber 1100 and the atmosphere outside of the column 1066, thus venting the ballast water chamber 1100 with atmosphere.

Figure 26:
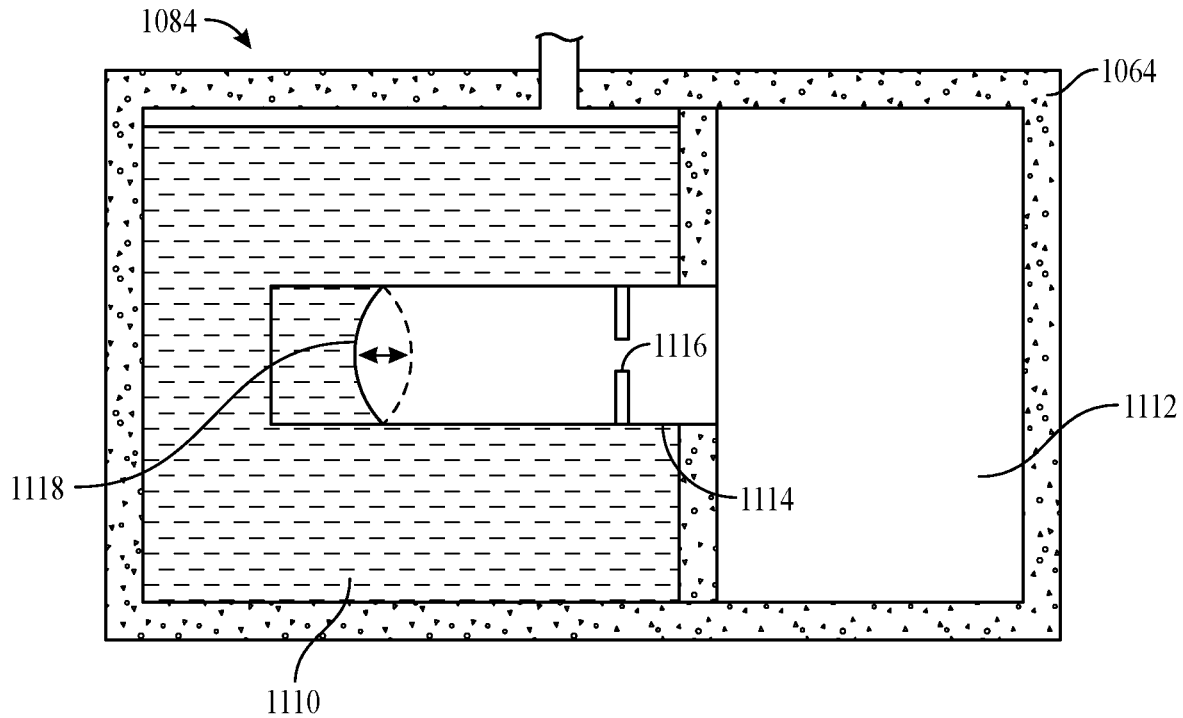
FIG. 26 is an enlarged cross-sectional view of the third embodiment of the improved TMD system shown in FIGS. 21 and 22.

Referring now to FIG. 26, one example of the TMD system 1084 is shown. The TMD system 1084 is shown within a horizontal beam 1064 of the semisubmersible FOWT platform 1062. It will be understood however, that the TMD system 1084 may also be formed in the base 1090 of the TMD system 1094. The TMD system 1084 includes a ballast water chamber 1110 and pressure chamber 1112. A damper pipe 1114 extends between the ballast water chamber 1110 and the pressure chamber 1112 and has an orifice defining an orifice damper 1116 formed in a first end thereof (the right-most end when viewing FIG. 26) for controlling an amount of pressurized air within the damper pipe 1114. A flexible and water impermeable diaphragm 1118 is formed in the damper pipe 1114 near a second end thereof (the left-most end when viewing FIG. 26). The diaphragm 1118 is movable against a force exerted by the water in the damper pipe 1114 in response to air pressure in the damper pipe 1114. The damper pipe 1114 may have a diameter within the range of about 1 m to about 20 m.

Figure 27:
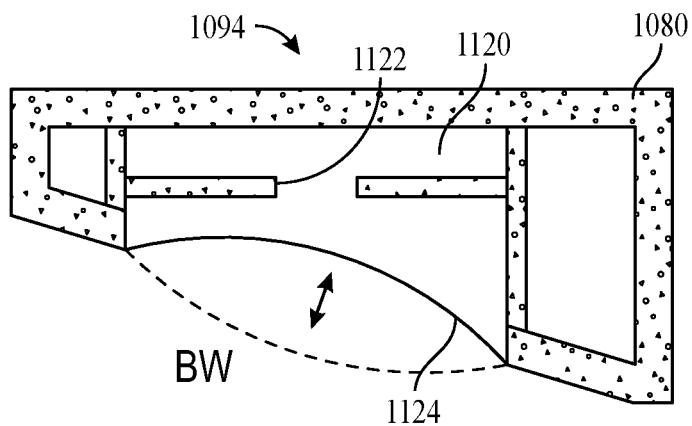
FIG. 27 is an enlarged cross-sectional view of the fourth embodiment of the improved TMD system shown in FIGS. 23 and 24.

Referring now to FIG. 27, one example of the TMD system 1094 is shown. The TMD system 1094 is shown within a beam 1080 of the tension leg FOWT platform 1076. The TMD system 1094 includes pressure chamber 1120 having an orifice defining an orifice damper 1122 formed therein controlling an amount of pressurized air within the pressure chamber 1120. A flexible and water impermeable diaphragm 1124 is formed one end of the pressure chamber 1120 and separates the pressure chamber 1120 from the water outside of the beam 1080. The diaphragm 1124 is movable against a force exerted by the water in the body of water BW in response to air pressure in the pressure chamber 1120.

Although described in the context of a tension leg FOWT platform, the TMD system 1094 described herein may be configured to be used with any of the embodiments of the FOWT platforms described and illustrated herein.

Advantageously, any embodiment of the TMD system 1034 described and illustrated herein may be used in targeting design-driving FOWT platform responses and characteristics that include, but are not limited to: (1) system heel angle, wherein the TMD system's dynamic heel angle is a typical design-driving criteria that impacts the robustness of the structural design in not only FOWTs, but floating offshore platforms in general. Implementing mass damper technologies, such as the TMD system 1034 into the hull of a FOWT platform has been shown to decrease dynamic heel motion. Reduction in heel motion correlates with a reduction in both fatigue and ultimate loads for various structural components in the hull 1012, the tower 1014, and the wind turbine 1016 mounted thereon; (2) system heave motion, wherein the use of a TMD in a FOWT platform will reduce the response to heave (vertical) motion of the platform. This may allow FOWT hulls to be designed with less concern with the turbine and environmental loading frequencies; (3) turbine harmonic forcing, wherein fatigue damage due to turbine harmonic loads associated with blade rotation is a prominent consideration in a wind turbine tower's design. Because such fatigue occurs at known frequencies, a TMD may be used for load mitigation and therefore improved fatigue performance, and (4) responses due to the wave environment, wherein TMDs within a FOWT platform hull may be set to target a wave frequency response and thus may mitigate dynamic and structural responses associated with waves.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A motion absorbing system, comprising:
   a structure adapted to float on a body of water;
   a container coupled to said structure, said container having a liquid disposed therein wherein a ullage is defined above a surface of said liquid; and
   an elastic element disposed in said liquid, said elastic element having a natural frequency tuned to damp motion of said liquid caused by water movement in the body of water acting on said structure;
   wherein said elastic element comprises a tube having a closed end and an open end, said tube being fixedly positioned in said liquid, said tube having a piston of said liquid residing in said tube to seal said open end wherein a gas fills said tube between said piston and said closed end of said tube, said tube including a flow constrictor disposed therein such that said gas passes through said flow constrictor when said gas experiences compression and when said gas experiences expansion.

2. A motion absorbing system as in claim 1, wherein said tube varies in diameter along the length thereof.

3. A motion absorbing system as in claim 2, wherein a longitudinal axis of said tube is approximately perpendicular to said surface of said liquid.

4. A motion absorbing system as in claim 1, wherein said elastic element is selected from the group consisting of a bellows disposed in said liquid and a balloon disposed in said liquid.

5. A motion absorbing system as in claim 1, wherein said elastic element is coupled to said container.

6. A motion absorbing system as in claim 1, wherein said container comprises a ballast tank of said structure.

7. A motion absorbing system for a structure, comprising:
   a container adapted to be coupled to a structure, said container having a liquid disposed therein wherein a ullage is defined above a surface of said liquid; and
   an elastic element disposed in said liquid, said elastic element having a natural frequency tuned to damp motion of said liquid;

wherein said elastic element comprises a tube having a closed end and an open end, said tube being fixedly positioned in said liquid, said tube having a piston of said liquid residing in said tube to seal said open end wherein a gas fills said tube between said piston and said closed end of said tube, said tube including a flow constrictor disposed therein such that said gas passes through said flow constrictor when said gas experiences compression and when said gas experiences expansion.

8. A motion absorbing system as in claim 7, wherein said tube varies in diameter along the length thereof.

9. A motion absorbing system as in claim 7, wherein a longitudinal axis of said tube is approximately perpendicular to said surface of said liquid.

10. A motion absorbing system as in claim 7, wherein said elastic element is selected from the group consisting of a bellows disposed in said liquid and a balloon disposed in said liquid.

11. A motion absorbing system as in claim 7, wherein said elastic element is coupled to said container.

12. A motion absorbing system as in claim 7, wherein the structure floats on a body of water, and wherein said container comprises a ballast tank.

13. A motion absorbing system comprising a plurality of motion absorbers adapted to be coupled to a structure, each of said motion absorbers including
   a container adapted to be coupled to structure, said container having a liquid disposed therein wherein a ullage is defined above a surface of said liquid; and
   an elastic element disposed in said liquid, said elastic element having a natural frequency tuned to damp motion of said liquid;
   wherein said elastic element comprises a tube having a closed end and an open end, said tube being fixedly positioned in said liquid, said tube having a piston of said liquid residing in said tube to seal said open end wherein a gas fills said tube between said piston and said closed end of said tube, said tube including a flow constrictor disposed therein such that said gas passes through said flow constrictor when said gas experiences compression and when said gas experiences expansion.

14. A motion absorbing system as in claim 13, wherein said tube varies in diameter along the length thereof.

15. A motion absorbing system as in claim 13, wherein a longitudinal axis of said tube is approximately perpendicular to said surface of said liquid.

16. A motion absorbing system as in claim 13, wherein said elastic element is selected from the group consisting of a bellows disposed in said liquid and a balloon disposed in said liquid.

17. A motion absorbing system as in claim 13, wherein said elastic element is coupled to said container.

18. A motion absorbing system as in claim 13, wherein said container comprises a ballast tank.

19. A motion absorbing system as in claim 13, further comprising a duct in fluid communication with at least two of said motion absorbers.

20. A method of absorbing motion experienced by a structure, said method comprising the steps of:
   coupling at least one rigid container to a structure disposed in an environment capable of inducing movement of the structure, wherein each said rigid container has a liquid disposed therein and wherein a ullage is defined above a surface of said liquid; and
   positioning an elastic element in said liquid disposed in each said rigid container, each said elastic element having a natural frequency tuned to damp motion of said liquid caused by the environment.

21. A method according to claim 20, wherein said step of positioning includes the steps of:
   providing a tube having a closed end and an open end; and
   fixedly positioning said tube in said liquid wherein a piston of said liquid resides in said tube to seal said open end, and wherein a gas fills said tube between said piston and said closed end of said tube, said tube including a flow constrictor disposed therein such that said gas passes through said flow constrictor when said gas experiences compression and when said gas experiences expansion.

22. A method according to claim 21, wherein said step of fixedly positioning said tube includes the step of aligning a longitudinal axis of said tube to be approximately perpendicular to said surface of said liquid.

23. A method according to claim 20, wherein said step of positioning is selected from the group consisting of positioning a bellows in said liquid and positioning a balloon in said liquid.

24. A method according to claim 20, wherein said step of positioning includes the step of coupling said elastic element to said container.

25. A method according to claim 20, wherein the environment causes said movement of the structure in a plurality of dimensions, and wherein said at least one rigid container comprises a plurality of rigid containers having said liquid disposed in each of said rigid containers and having one said elastic element disposed in each said liquid, said method further comprising the step of arranging said plurality of rigid containers to damp said movement of the structure in the plurality of dimensions.

26. A method of absorbing motion experienced by a structure floating on a body of water, said method comprising the steps of:
   providing a floating structure in a body of water, said floating structure including a ballast tank having ballast water disposed therein wherein a ullage is defined above a surface of said ballast water; and
   positioning an elastic element in said ballast water, each said elastic element having a natural frequency tuned to damp motion of said ballast water caused by water movement in the body of water acting on the floating structure.

27. A method according to claim 26, wherein said step of positioning includes the steps of:
   providing a tube having a closed end and an open end; and
   fixedly positioning said tube in said ballast water wherein a piston of said ballast water resides in said tube to seal said open end, and wherein a gas fills said tube between said piston and said closed end of said tube, said tube including a flow constrictor disposed therein such that said gas passes through said flow constrictor when said gas experiences compression and when said gas experiences expansion.

28. A method according to claim 27, wherein said step of fixedly positioning said tube includes the step of aligning a longitudinal axis of said tube to be approximately perpendicular to said surface of said ballast water.

29. A method according to claim 26, wherein said step of positioning is selected from the group consisting of positioning a bellows in said ballast water and positioning a balloon in said ballast water.

30. A method according to claim 26, wherein said step of positioning includes the step of coupling said elastic element to said ballast tank.

31. A tuned mass damper (TMD) system in combination with a floating offshore wind turbine (FOWT) platform comprising:
a barge type FOWT platform having a hull configured to have a wind turbine tower mounted thereon;
characterized in that:
a TMD system is mounted in hull having:
a first TMD configured to operate at a first frequency; and
a second TMD configured to operate at a second frequency different than the first frequency;
wherein the first TMD includes a first water ballast chamber that defines a mass of the first TMD, and wherein the second TMD includes a second water ballast chamber that defines a mass of the second TMD.

32. The TMD system in combination with a FOWT platform according to claim 31, wherein at least one of the first and second TMDs is configured to mitigate at least one of heave motion, heel motion, turbine harmonic loading, and wave environment loading of the barge type FOWT platform.

33. The TMD system in combination with a FOWT platform according to claim 31, wherein at least one of the first and second TMDs is configured to allow the FOWT platform to effectively operate with rigid body heave and heel natural frequencies within its intended wave energy range.

34. A tuned mass damper (TMD) system in combination with a floating offshore wind turbine (FOWT) platform comprising:
a FOWT platform having a center, at least three legs extending radially from the center, and configured to have a wind turbine tower mounted thereon;
characterized in that:
a TMD system, a portion of which is mounted in each of the legs, each leg having:
a first TMD at an outboard end of each leg and configured to operate at a first frequency; and
a second TMD at an inboard end of each leg configured to operate at a second frequency different than the first frequency;
wherein the first TMD includes a first water ballast chamber that defines a mass of the first TMD, and wherein the second TMD includes a second water ballast chamber that defines a mass of the second TMD.

35. The TMD system in combination with a FOWT platform according to claim 34, wherein at least one of the first and second TMDs is configured to mitigate at least one of heave motion, heel motion, turbine harmonic loading, and wave environment loading of the FOWT platform.

36. The TMD system in combination with a FOWT platform according to claim 34, wherein at least one of the first and second TMDs is configured to allow the FOWT platform to effectively operate with rigid body heave and heel natural frequencies within its intended wave energy range.

37. The TMD system in combination with a FOWT platform according to claim 34, wherein the FOWT platform is a barge type platform having a hull comprising a keystone and four legs attached thereto and defining a cross shape.

38. The TMD system in combination with a FOWT platform according to claim 37, wherein at least one of the first and second TMDs is configured to mitigate at least one of heave motion, heel motion, turbine harmonic loading, and wave environment loading of the FOWT platform.

39. The TMD system in combination with a FOWT platform according to claim 38, wherein at least one of the first and second TMDs is configured to allow the FOWT platform to effectively operate with rigid body heave and heel natural frequencies within its intended wave energy range.

40. The TMD system in combination with a FOWT platform according to claim 34, wherein each first TMD further includes:
a first pressure chamber within each leg connected to a source of pressurized air and a having an air pressure greater than atmospheric pressure;
a first damper pipe having a closed first end and an open second end, the first end attached to an upper end of the first water ballast chamber, the first damper pipe extending toward a floor of the first water ballast chamber, such that the second end is spaced a distance apart from the floor of the first water ballast chamber; and
a first connecting pipe extending between the first pressure chamber and an upper portion of the first damper pipe, the first connecting pipe configured for the flow of pressurized air therethrough.

41. The TMD system in combination with a FOWT platform according to claim 40, wherein each second TMD further includes:
a second pressure chamber within each leg connected to a source of pressurized air and a having an air pressure greater than an air pressure within the first pressure chamber;
a second damper pipe having a closed first end and on open second end, the first end attached to an upper end of the second water ballast chamber, the second damper pipe extending toward a floor of the second water ballast chamber, such that the second end is spaced a distance apart from the floor of the second water ballast chamber; and
a second connecting pipe extending between the second pressure chamber and an upper portion of the second damper pipe, the second connecting pipe configured for the flow of pressurized air therethrough.

42. The TMD system in combination with a FOWT platform according to claim 41, wherein first connecting pipe and the second connecting pipe include an adjustable orifice, and wherein an inside diameter of the adjustable orifices are adjustable for active control of the flow of pressurized air from the first pressure chamber and the second pressure chamber, respectively.

43. The TMD system in combination with a FOWT platform according to claim 42, wherein the TMD system further includes:
a controller attached to the FOWT platform;
a sea state sensor mounted to the FOWT platform and operatively connected to the controller;
a position sensor connected to each of the adjustable orifices within the first and the second connecting pipes, and operatively connected to the controller; and
a pressure sensor connected to each of the first and the second pressure chambers and operatively connected to the controller;
wherein the controller is configured to actively control an operating frequency of the first and second TMDs based on input from the sea state sensor.

44. The TMD system in combination with a FOWT platform according to claim 43, wherein active control of the operating frequency of the first and second TMDs includes at least one of changing a stiffness of the first and second TMDs by changing the air pressure in the first and second pressure chambers, respectively, and changing a damping frequency of the first and second TMDs by changing the size of the adjustable orifices within the first and second connecting pipes, thus changing a volume of air flow through the first and second connecting pipes.

45. The TMD system in combination with a FOWT platform according to claim 42, wherein the first pressure chamber is configured as a low frequency pressure chamber and the second pressure chamber is configured as a high frequency pressure chamber.

46. The TMD system in combination with a FOWT platform according to claim 45, wherein the first TMD is configured to at least one of mitigate heeling and reduce rotational movement of the hull.

47. The TMD system in combination with a FOWT platform according to claim 46, wherein the second TMD is configured to mitigate up and down motion vertical motion of the hull.

48. A tuned mass damper (TMD) system configured for use in a floating offshore wind turbine (FOWT) platform comprising:
a buoyant base having a tower extending outwardly and upwardly therefrom, the tower configured to have a wind turbine mounted thereon;
characterized in that:
a TMD is mounted in the base and includes:
a pressure chamber formed within the base, the pressure chamber connected to a source of pressurized air and having an air pressure greater than atmospheric pressure;
an orifice damper formed in the pressure chamber; and
a flexible and water-impermeable diaphragm mounted between the pressure chamber and the body of water in which the FOWT platform is deployed, the water urging against the diaphragm defining a mass of the TMD.

49. The TMD system in combination with a FOWT platform according to claim 48, wherein the FOWT platform is a spar type FOWT platform.

50. A tuned mass damper (TMD) system in combination with a floating offshore wind turbine (FOWT) platform comprising:
a semi-submersible type FOWT platform having a center, at least three legs extending radially from the center, a center column, an outer column at a distal end of each of the at least three legs, and configured to have a wind turbine tower mounted on the center column;
characterized in that:
a TMD system is mounted in the FOWT platform and includes a horizontally oriented first TMD mounted in each of the legs, and a vertically mounted second TMD mounted in each of the columns;
wherein the first TMDs in each leg include a first water ballast chamber that defines a mass of the first TMD, and wherein the second TMDs in each column include a second water ballast chamber that defines a mass of the second TMD; and
wherein each of the first and the second TMDs may be configured to operate at a different frequency.

51. The TMD system in combination with a FOWT platform according to claim 50, wherein at least one of the first and second TMDs is configured to mitigate at least one of heave motion, heel motion, turbine harmonic loading, and wave environment loading of the FOWT platform; and wherein at least one of the first and second TMDs is configured to allow the FOWT platform to effectively operate with rigid body heave and heel natural frequencies within its intended wave energy range.

* * * * *